(12) United States Patent
Bashan et al.

(10) Patent No.: US 11,821,802 B2
(45) Date of Patent: *Nov. 21, 2023

(54) SYSTEM AND METHODS FOR A MULTI-FUNCTION PRESSURE DEVICE USING PIEZOELECTRIC SENSORS

(71) Applicant: ROTAL INNOVATIVE TECHNOLOGIES LTD., Kfar Saba (IL)

(72) Inventors: Amir Bashan, Har Halutz (IL); Amir Tal, Netanya (IL); Meir Tal, Hibat Zion (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/520,676

(22) Filed: Nov. 7, 2021

(65) Prior Publication Data

US 2022/0057284 A1 Feb. 24, 2022

Related U.S. Application Data

(63) Continuation of application No. 16/076,027, filed as application No. PCT/IB2017/050382 on Jan. 25, 2017, now Pat. No. 11,169,040.

(Continued)

(51) Int. Cl.
*G01L 13/02* (2006.01)
*G01L 27/00* (2006.01)
(Continued)

(52) U.S. Cl.
CPC .......... *G01L 13/025* (2013.01); *B01D 29/606* (2013.01); *B01D 29/68* (2013.01);
(Continued)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142;
(Continued)

*Primary Examiner* — Andre J Allen
(74) *Attorney, Agent, or Firm* — ALPHAPATENT ASSOCIATES, LTD; Daniel J. Swirsky

(57) ABSTRACT

A pressure measuring device configured as a multi-function device operable as a differential pressure switch (DPS), a differential pressure transducer (DPT), a pressure switch (PS), a pressure transducer (PT) providing readings of high and low pressure zones, a data recording logger, and a backwashing controller. The pressure measuring device may use at least two piezoelectric sensors operable to measure pressure attributes. The associated electronic hardware, processing unit, cables and pressure tubing are retrofittable and packaged in a molded case, with no moving parts with the electronic hardware fully coated to make the device reliable and resistant to extreme environmental conditions. The device is configured for remote access, enabling remote device configuration, maintenance and servicing. The device is further operable to communicate with various external devices: a tablet, a smartphone and the like as a user interface and further provides wired interface with a programmable logic controller (PLC) via RS-485 interface.

21 Claims, 22 Drawing Sheets

Related U.S. Application Data

(60) Provisional application No. 62/292,319, filed on Feb. 7, 2016.

(51) Int. Cl.
  | | |
  |---|---|
  | *G01L 9/00* | (2006.01) |
  | *B01D 29/60* | (2006.01) |
  | *B01D 29/68* | (2006.01) |
  | *B01D 35/12* | (2006.01) |
  | *G01L 19/08* | (2006.01) |

(52) U.S. Cl.
  CPC .............. *B01D 35/12* (2013.01); *G01L 9/008* (2013.01); *G01L 19/086* (2013.01); *G01L 27/005* (2013.01)

(58) Field of Classification Search
  CPC ......... G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
  USPC ..................................................... 73/700–756
  See application file for complete search history.

(P1= PRESSURE TO BE MEASURED)

SYSTEM AND METHODS FOR A MULTI-FUNCTION PRESSURE DEVICE USING PIEZOELECTRIC SENSORS

CROSS-REFERENCE TO RELATED APPLICATIONS

This application is a continuation application of U.S. patent application Ser. No. 16/076,027, filed on Aug. 7, 2018, as a U.S. National Phase Application under 35 U.S.C. 371 of International Application No. PCT/IB2017/050382, which has an international filing date of Jan. 25, 2017, and which claims priority and benefit from U.S. Provisional Patent Application No. 62/292,319, filed Feb. 7, 2016, the contents and disclosure of which are incorporated herein by reference in their entirety.

FIELD OF THE DISCLOSURE

The disclosure herein relates to a pressure measurement systems and methods for various systems. In particular, the disclosure relates to a differential pressure measuring device based upon piezoelectric technology and operable as a multi-function pressure measuring device using at least two piezoelectric components to determine the pressure difference.

BACKGROUND

Pressure monitoring and measuring devices are essential components of most systems that play an important role in modern life technology. Piping systems, for example, are related to various technological sectors such as water systems, gas and oil systems, and various industrial systems. Thus, piping systems are used for a wide range of applications in various technological sectors. The water sector may include water transmission lines, water distribution networks, heating networks, cooling networks, sewage and drainage systems and the like. Gas and oil industries may include crude oil conveyance, offshore platform piping, refinery utility piping, firewater lines, water flood lines and the like. Industrial systems may include industrial plant piping, petrochemical plants, sea water systems, ballast piping, crude oil washing and the like. Furthermore, piping system may additionally be associated with other technological sectors such as health care systems, medical devices and much more.

Specifically, monitoring and controlling of systems in such environments, is extremely important in terms of efficiency, reliability and safety to prevent any hazardous operational failure that may cost time, money and productivity loss. Moreover, pressure monitoring and measuring of such complex systems require a variety of measuring and monitoring devices coupled with control functions to support the well-being of such system. Maintenance, of such systems require various devices such as pressure switches, pressure transducers or transmitters, differential pressure transducers or transmitters, data recording loggers, and various other control devices to enable backwashing of system, for example, or managing remote devices or controlling field network environments.

Furthermore, most of the measuring and monitoring devices include electro-mechanical components which are bound to failure. For example, a pressure switch is an electro-mechanical device designed to monitor pressure and provide an output when a set pressure (a set point) is reached. A differential pressure switch (DPS) is another electro-mechanical device operating on the basic principle of opposing forces, and is mainly used for sensing a difference in pressure between two points in a system. In these devices, as known in the art, the basic essential components, as used in various combinations to manufacture variants of differential and pressure switches to suit various of industrial applications, are associated with a sensing element made either of bellows, diaphragm (metallic or elastomeric) or pistons; a stable spring to determine the range set point; and a snap-acting micro-switch to enable closing or opening the switch.

The need remains therefore for a unified efficient and reliable product operable to cover the desired functionalities in one configurable box with no mechanical moving part. The current disclosure addresses these needs.

SUMMARY

According to one aspect of the presently disclosed subject matter, there is provided a multi-function pressure device operable to manage pressure control in a system comprising at least one flow limiting device, the multi-function pressure device comprising: a differential pressure measuring system comprising measuring sensors and at least one set of external interfaces; a flushing control system configured to control a flushing procedure of the at least one flow limiting device of the system; at least one processor operable to execute a software module configured to interpret and analyze measured data from the measuring sensors and operate the multi-function pressure device according to a pre-configured functionality; and at least one communication unit in communication with the at least one processor and further operable to communicate with at least one external communication device via at least one communication interface; wherein the measuring sensors include at least a first piezoelectric measuring sensor accommodated in a first isolated compartment and connectable to a first pressure port and a second piezoelectric measuring sensor accommodated in a second isolated compartment and connectable to a second pressure port.

Variously, the pre-configured functionality of the multi-function pressure device determines the device active type selected from a group consisting of: a differential pressure transducer (DPT); a differential pressure switch (DPS); a pressure switch (PS), a pressure transducer (PT); a data logger and combinations thereof. As appropriate, wherein the pre-configured functionality is selectable via a software module and may further be configured for updates. Optionally, the pre-configured functionality of the multi-function pressure device is determined according to factory setup parameters.

Variously, the at least one external communication device is selected from a group consisting of: a smartphone, a tablet, a laptop, a personal computer, a server, a programmable logic controller (PLC) and combinations thereof.

As appropriate, the at least one communication interface is associated with a communication protocol selected from a group consisting of communication protocols: a Wireless Network (Wi-Fi) protocol, a Bluetooth protocol, a ZigBee protocol, a Thread protocol, a Near Field Communication (NFC) protocol and combinations thereof.

As appropriate, the flushing procedure of the multi-function pressure device is operable according to a flushing scheduling plan. Furthermore, the flushing control system of the multi-function pressure device may be operable according to RS-485 electrical characteristics standard to enable communication with an associated network comprising at least one programmable logic controller (PLC) device. Additionally, the flushing control system device may be operable according to a configured state selected from enabled and disabled and may use an externally conformable system if connectable to the multi-function pressure device As appropriate, the at least one processor of the multi-function pressure device further comprises at least one memory unit configured to store the measured data received from the at least two absolute measuring sensors.

As appropriate, the at least one processor of the multi-function pressure device further comprises an internal clock configured to associate a timestamp with each pressure measurement.

As appropriate, the multi-function pressure device may be retrofittable in a molded casing such that the electronic components are not exposed to the external environment. Additionally, the differential pressure measuring system of the multi-function pressure device comprises electronic and software components, optionally with no moving mechanical parts.

As appropriate, the multi-function pressure device of claim 1, further comprising power supply wires operable to provide power supply in the range of 6 to 24 volts DC. Optionally, the power supply is configured to use a battery operable for at least one year. Alternatively, the power supply of the multi-function pressure device may use a rechargeable battery operable for at least one year.

As appropriate, the at least one set of external interfaces of the multi-function pressure device comprises a differential pressure switch wash-valve control output. Further, the at least one set of external interfaces may further comprise a differential pressure switch master-wash-valve control output.

As appropriate, at least one set of external interfaces comprises at least one analog output configured to communicate output measurements pertaining to at least one of: a first port pressure measurement, a second port pressure measurement and a differential pressure between the first port and the second port. Additionally, the at least one analog output comprises a first output contact, a second output contact and a common output contact.

As appropriate, wherein the at least one set of external interfaces of the multi-function pressure device comprises a two wired interface configured to enable wired communication.

As appropriate, the analog outputs are compatible with an output standard selected from a group consisting of: 4-20 milliamps, 0-5 volts DC, 1-5 volts DC, 0-10 volts DC and 1-10 volts DC and combinations thereof.

According to another aspect of the presently disclosed subject matter, there is provided a method for use in a multi-function pressure device installable in a system comprising at least one flow limiting device, the multi-function pressure device comprising a first piezoelectric measuring sensor configured to provide a first port pressure measurement, a second piezoelectric measuring sensor a second port pressure measurement, a communication unit in communication with at least one external communication device and a processing unit encapsulated in a molded casing. The method for using the multi-function pressure device is configurable to manage pressure control in an improved manner, the method comprising: determining a functional configuration of the multi-function pressure device, the functional configuration specifies a device active type of the multi-function pressure device; receiving at least one electronic signal from the first piezoelectric measuring sensor expressive of the first port pressure measurement; receiving at least one electronic signal from the second piezoelectric measuring sensor expressive of the second port pressure measurement; and operating the multi-function pressure device according to the functional configuration.

Variously, the active type of the multi-function pressure device is selected from a group consisting of: a differential pressure transducer (DPT), a differential pressure switch (DPS), a pressure switch (PS), a pressure transducer (PT), a data logger and combinations thereof.

Accordingly, the determining of the functional configuration comprises: pairing with the at least one external communication device; and receiving, from the at least one external communication device, setup instructions to determine the functional configuration for according to the device active type. Additionally, the functional configuration of the method further comprises: obtaining an associated calibration curve; and calibrating the multi-function pressure device according to the associated calibration curve of the device active type. The associated calibration curve further comprises gathering data from a plurality of pressure measuring devices and constructing the associated calibration curve of the device active type using data obtained from the plurality of pressure measuring devices.

As appropriate, the operating of the multi-function pressure device, comprises recording data pertaining to measurement data associated with the first pressure sensing port and the second pressure sensing port, data pertaining to associated switching schedule activated; and sending recorded data to the at least one external communication device.

Optionally, the operating of the multi-function pressure device, may comprises transmitting of measured data to the at least one external communication device in real-time, where the at least one external communication device is selected from a group consisting of: a smartphone, a tablet, a laptop, a personal computer, a server, a programmable logic controller (PLC) and combinations thereof.

Optionally, the operating of said multi-function pressure device, comprises: determining a pressure difference between pressure measured at the first pressure sensing port and the pressure measured at the second pressure sensing port; if the pressure difference value is greater than a first threshold or lower than a second threshold then communicating the pressure difference value; and if the pressure difference value is below the first threshold and above the second threshold then communicating said pressure difference value and further activating a response procedure. Variously, the response procedure is selected from a group consisting of: transmitting an alerting signal, transmitting a warning signal, driving a solenoid or combinations thereof.

Additionally, the operating of the multi-function pressure device, may comprise: sending an analog signal proportional to the pressure measured at the associated pressure sensing port according to a selected analog output standard. Variously, the analog output standard is selected from a group consisting of: 4-20 milliamps, 0-5 volts DC, 1-5 volts DC, 0-10 volts DC and 1-10 volts DC and combinations thereof.

Further, the operating of the multi-function pressure device, may comprise: controlling a flushing procedure of the at least one flow limiting device according to a configurable flushing schedule.

As appropriate, the operating of the multi-function pressure device, comprises: obtaining a pressure measurement, where the pressure measurement is selected from pressure measured at the first pressure sensing port and the pressure measured at the second pressure sensing port; if said pressure measurement value is lower than a first pressure threshold then recording said pressure measurements and activating a solenoid, and if said pressure measurement value is higher than the first pressure threshold then recording said pressure measurement.

As appropriate, the operating of the multi-function pressure device, comprises: obtaining a pressure measurement, where the pressure measurement is selected from pressure measured at the first pressure sensing port and the pressure measured at the second pressure sensing port; if the pressure measurement value is higher than a second pressure threshold then recording said pressure measurements and deactivating a solenoid, and if the pressure measurement value is lower than the second pressure threshold then recording said pressure measurement.

As appropriate, the operating of said multi-function pressure device, comprises: obtaining a pressure measurement, where the pressure measurement is selected from pressure measured at the first pressure sensing port and the pressure measured at the second pressure sensing port; if said pressure measurement value is lower than a first pressure threshold then activating a solenoid, if the pressure measurement value is higher than the first pressure threshold then, if the pressure measurement value is higher than a second pressure threshold then deactivating a solenoid, and if the pressure measurement value is lower than the second pressure threshold then recording the pressure measurement.

BRIEF DESCRIPTION OF THE DRAWINGS

For a better understanding of the embodiments and to show how they may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1A:
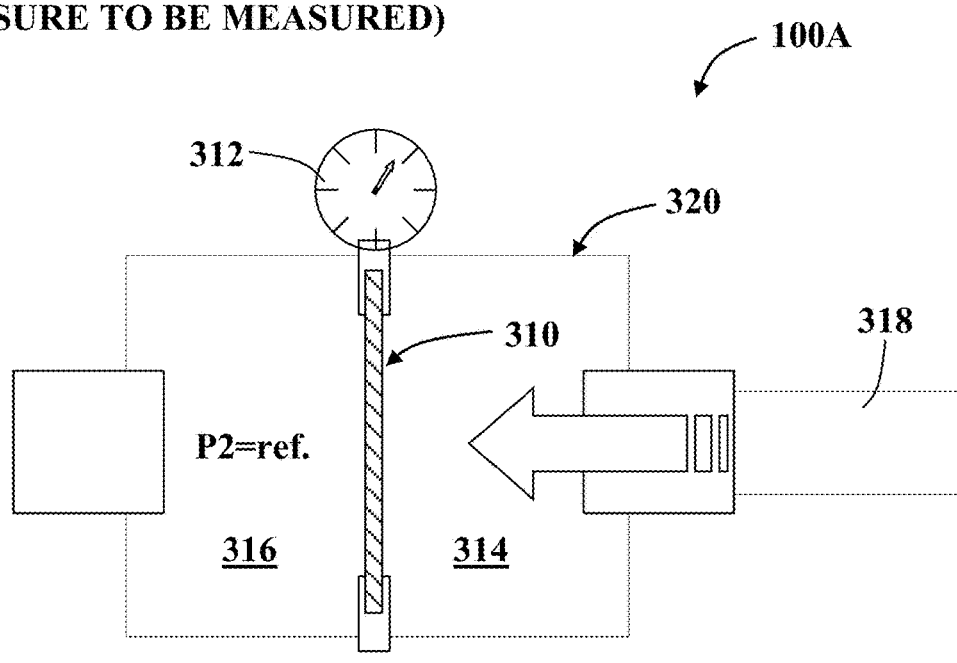
FIG. 1A is a schematic prior art pressure measuring illustration showing the pressure measurement compared with a reference.

It is noted that the systems and methods of the invention herein may not be limited in their application to the details of construction and the arrangement of the components or methods set forth in the description or illustrated in the drawings and examples. The systems and methods of the invention may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

In various embodiments of the invention, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

As used herein "a pressure switch (PS)" refers to a device operable to monitor a process pressure in a system and provide an output indication via a micro-switch when a certain set pressure (a set-point) is reached in its input port when pressure goes up or down.

As used herein "a pressure transducer (PT)" also referenced as "a pressure transmitter" or "a pressure sensor", refers to a device operable to convert pressure into an electrical signal, thus enabling to measure pressure for control purposes or transfer of associated pressure information in systems. It is noted that there are various types of pressure transducers, such as the commonly used strain-gage base transducer. It is further noted that within the context of the current disclosure, the type referred to is based upon a piezoelectric component.

It is noted that a transducer and a transmitter convert energy from one form to another and provide an output signal and are virtually the same thing. The main difference being the type of electrical signal each sends. A transducer sends a signal in volts (V) or millivolt (mV) and a transmitter sends a signal in milliamps (mA). Furthermore, in common practice, the electrical output signal over larger distances require a transmitter which is basically a transducer with extra electronics to amplify the signal, thus the two wire, 4-20 mA current output has long been accepted worldwide as the main method of transmitting pressure transducer signals over longer distances.

It is further noted that the terms of "a transducer" and "a transmitter" may be used interchangeably in this application.

As used herein "a differential pressure switch (DPS)" refers to a device operable to monitor a pressure difference (of opposing forces over a sensing element) between two points in a system based on a mechanism of measuring opposing forces. The DPS may provide an output indication when a certain set pressure (a set-point) is reached.

As used herein "a differential pressure transducer (DPT)" refers to a device operable to measure the pressure difference between two points in a system. Commonly the differential pressure transducer is used to measure differential pressure across a flow limiting device such as a filter, a valve or calculate flow across an orifice plates.

As used herein "a data logger" refers to an electronic data recording device that records pressures and associated occurrences over time operable in systems comprising pressure switches and differential pressure switches.

As used herein the term "flushing", "backwashing" is associated with flow restricting devices, such as filters, valves and the like become clogged. Cleaning is required to avoid damages, and one of the best ways to clean a system's flow restricting device is to backwash it, by reversing the flow and increasing the velocity at which water, for example, passes back through the filter.

As used herein the term "set point" is a discrete pressure at which the pressure switch is adjusted to function (actuating or de-actuating) on rising or falling pressure. It falls within the adjustable range and the set point value is usually called out as increasing or decreasing pressure.

As used herein the term "set point range" is the range within which the switch can be set from the lowest to the highest point, usually expressed in bar, psi, inches of mercury or inches of water column or other acceptable pressure measurement units.

As used herein the "sensing element" is the part of a device reacting directly in response to the measured attribute such as force, pressure and tension, converting the associated attribute into an electrical signal.

As used herein, the term "retrofittable" means that the hardware, electronic and software components of the pressure measuring device may be configured such that the pressure measuring device is insertable into and removable from the molded casing.

The term "insertable", as used in the present disclosure, means that the pressure measuring device electronic components may be inserted into, and conductively connected.

The term "removable", as used in the present disclosure, means that the wireless power receiver may be removed from, and conductively disconnected.

As used herein, the "multi-function pressure device" of the presently disclosed subject matter may be referred to as "a piezoelectric pressure device", "a pressure measuring device", "a differential pressure measuring device", "a piezoelectric differential pressure measuring device".

Prior Art Pressure Devices:

Instruments connected to a system may indicate pressures relative to a reference pressure. Thus, pressure measuring devices are configured to measure system pressure in comparison to a reference pressure and may be divided into pressure measuring devices categories measuring absolute, gauge and differential pressure.

Absolute pressure measuring device is configured to measure pressure with reference to the vacuum, referred to as zero pressure; gauge pressure measuring device is configured to measure pressure with reference to the ambient air pressure (atmospheric pressure); and differential pressure measuring device is configured to measure the pressure difference between any two points in a pressure system.

Reference is now made to FIG. 1A, there is provided a representation of prior art pressure measuring illustration, which is generally indicated at 100A, the pressure measuring illustration 100A is showing the pressure measurement compared with a reference.

The pressure measuring device used for the pressure illustration 100A includes a pressure compartment 320 split into a measuring compartment 314 with pressure of P1 to be measured, a reference compartment 316 with reference pressure P2, a sensing element 310 which is a diaphragm in this illustration, a gauge 312 providing display of the measured pressure. If the pressure reference P2 is a perfect vacuum, then, the measurement is showing absolute pressure. If the pressure reference P2 is ambient air pressure, then, the measurement is showing gauge pressure.

Figure 1B:
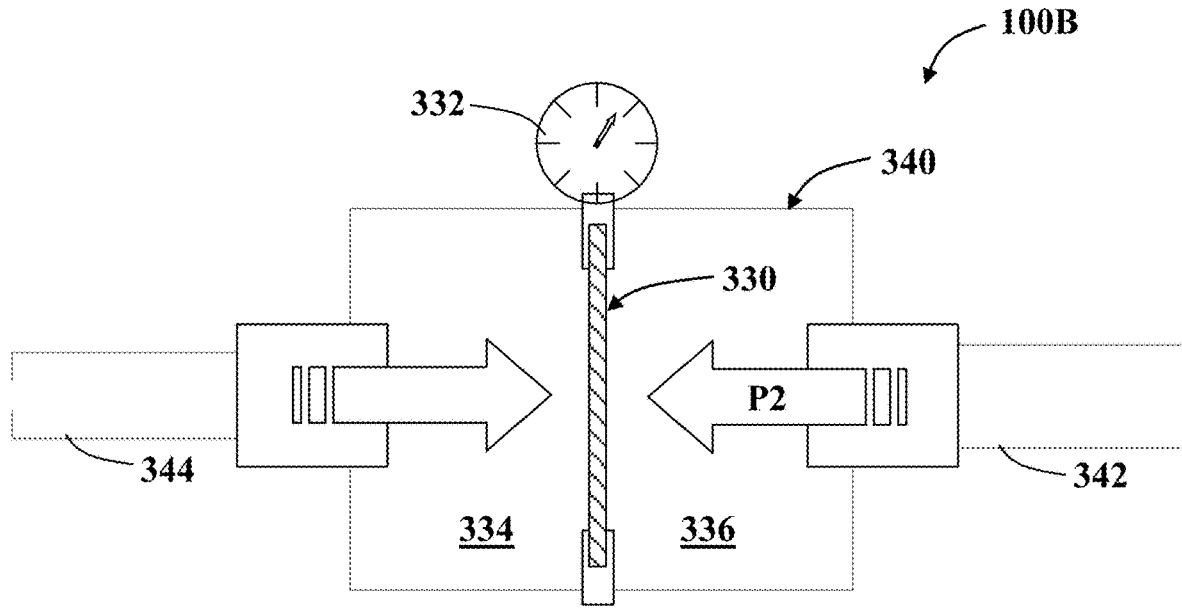
FIG. 1B is a schematic prior art pressure measuring illustration showing differential pressure measurement.

Reference is now made to FIG. 1B, there is provided another prior art pressure measuring illustration, which is generally indicated at 100B, the pressure measuring illustration 100B showing differential pressure measurement.

The pressure measuring device used for the pressure illustration 100B includes a pressure compartment 340 split into a first pressure compartment 334 associated with pressure of P1, a second pressure compartment 336 associated with pressure P2, a sensing element 330 which is a diaphragm in this illustration, a gauge 332 providing display of the measured differential pressure. The differential pressure display is the difference in pressures between P2 and P1.

It is noted that regarding prior art measuring devices, a differential pressure transducer is commonly an electro-mechanical device that operates on the basic principles of levers and opposing forces. These mechanical and electrical elements are mainly used for sensing a difference in pressure between two points in a system. There exist essential elements in the measuring device which are used in various combinations to manufacture hundreds of variants of differential and pressure switches to suit a variety of industrial applications. These basic elements are a sensing element made either of bellows, diaphragm (metallic or elastomeric), strain gauges or changing resistors; and a stable spring to determine the range set point.

Where the measuring device is a pressure switch (or a differential pressure switch) the measuring device may include a snap-acting micro-switch. Such switches may be available in a wide range of options.

It is noted that pressure switches may have various designs with a range of sensing elements. One of the most common sensing element is the diaphragm. Additionally or alternatively, a bellow or a piston may be used as the sensing element.

Device Configuration & Interfaces:

The pressure measuring device is configured as a multi-function device encapsulated in a molded case and may be operable as a differential pressure switch (DPS); a differential pressure transducer (DPT); a pressure transducer (PT) providing two readings of the high and the low pressure zones; a data recording logger for the pressure measurements and associated scheduling and events; and a backwashing (flushing) filtration controller.

The pressure measuring device may use at least two piezoelectric sensors operable to measure pressure and pressure changes, converting the measurements to produce an electrical charge in accordance with the mechanical pressure exerted. Various, piezoelectric sensors may be used operable in various pressure ranges, say, 0-7 bars, 0-10 bars, 0-20 bars and the like, which measure absolute pressure in the associated sensing points, thereafter translating pressure data to electric signals. The electric signals may then be analyzed by the processing unit, combining hardware and software, to provide the product's outputs. The associated electronic hardware, the processing unit, the cable, and the pressure tubing may be retrofittable and packaged in the molded case of plastic (or other material), optionally with no moving parts. Optionally, the pressure measuring device may be free of metal components, as the electronic hardware may be fully coated making the device highly reliable and resistant to extreme environmental conditions. Additionally, potential failure that may arise from corrosion forming is minimized, while requiring no frequent calibration and setting.

The pressure measuring device is operable using wired electrical cables as the power source. Alternatively, the device may be water proof battery pack (optionally rechargeable) operated. Furthermore, the device may use wired interfaces and wireless interfaces via a communication module using communication software to provide flexible device operation. The wired interfaces may include switch wired interfaces, analog output wired interfaces and a communication bus. Additionally, the pressure measuring device may use a built-in Bluetooth (BT) modem as part of the communication module, allowing the device to interface with Android or Apple iOS powered devices. The Bluetooth modem may serve as the full duplex communication system with the pressure measuring devices, allowing real-time readings of pressure and differential pressure measured as well as LOG reports.

It is particularly noted that the pressure measuring device may be configured for remote access, enabling remote device configuration, determining various functional options, maintenance and providing services according to its current configuration. Additionally, the device may be configured to alert the operator of malfunctions or of system failures. Moreover, the encapsulation of hardware and software components in one box with wireless interfaces provides a fully functional product and highly reliable, without usage of an integrated display or various input devices (keyboard, buttons and the like). A tablet or a smartphone, for example, may be used to interface and perform the necessary user interface functions.

It is further noted that the device is operable to provide wired interface with a programmable logic controller (PLC) via RS485 interface.

Figure 2:
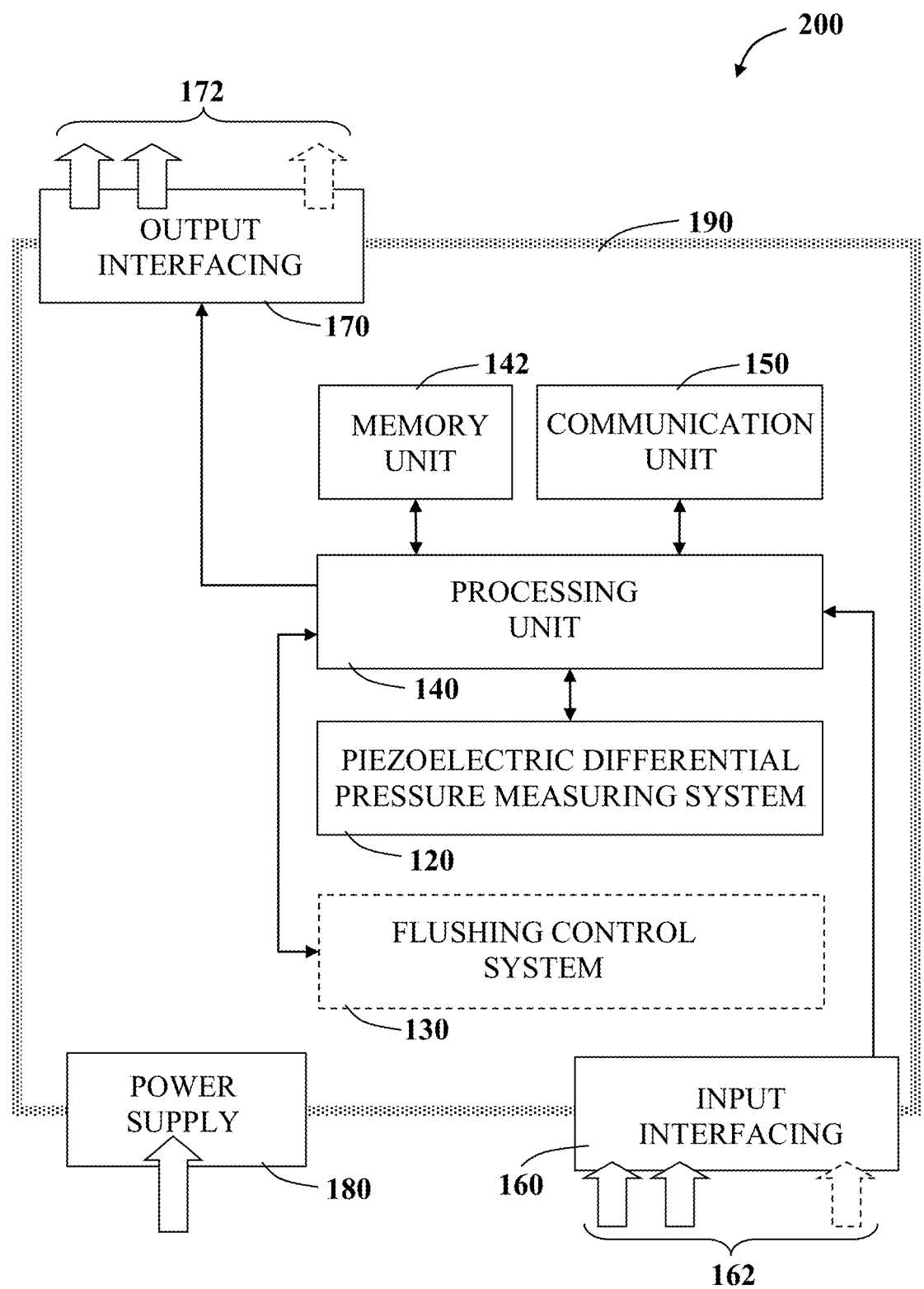
FIG. 2 is a schematic illustration of selected components of a differential pressure switch configured to provide pressure management of a system, according to the presently disclosed subject matter.

Embodiments of the Piezoelectric Device:

Reference is now made to FIG. 2, there is provided a schematic illustration of selected components of a differential pressure measuring device, which is generally indicated at 200, the device may be configured to provide pressure management of a piping system, according to the presently disclosed subject matter. The switch 200 may include a piezoelectric differential pressure measuring device 120 operable to provide differential and absolute pressure measurements, a flushing control system 130 operable to provide control over the filter flushing mechanism, a processing unit 140 operable to access and analyze measured pressure data and a communication unit 150 operable to provide the desired communication.

The piezoelectric differential pressure measuring device 120 is based upon piezoelectric components producing electrical voltage according to the associated mechanical pressure introduced. The processing unit 140, for example is operable to process the input measurements via the input interface 160 to deliver the various functional properties of the switch. The processing unit 140 is further operable to manage the output interface 170, as further described in FIG. 3. Additionally, the processing unit may use the memory 142, where applicable, throughout the data processing, configured to store the basic analysis result while continuously measuring the flow pressures.

The communication unit 150 is operable to provide various communication functionalities and further to enable interfacing with the switch, remote accessibility, reporting malfunction events, remote servicing, software upgradability and the like. The communication unit may use various communication protocols such as wireless network (Wi-Fi), Bluetooth, Thread, Near Field Communication (NFC), ZigBee and more.

It is noted that Bluetooth is a low power, global wireless communication standard that connects devices together over a short-range and uses radio waves instead of wires or cables to connect to a phone or computer. Specifically, as associated with the current disclosure, Bluetooth enables the differential pressure measuring device to connect with a smartphone, a tablet and the like as its user interface, avoiding the need of input devices such as keyboard, mouse, screen and more.

It is noted that the communication unit 150 may be operable to use an integrated bridging unit of a Wi-Fi adapter and a Bluetooth adapter, bridging the two connections. Creating a network bridge may allow to share a wireless Internet connection over a Bluetooth connection, enabling measuring devices which are Bluetooth compatible but not Wi-Fi compatible to access the Web or communicate remotely with a central server. Such unit may further comprise an RS-485 adapter.

Where appropriate the differential pressure measuring device may further include a telecommunication unit (not shown) for longer range communication. The telecommunication unit may be used to connect with controllers via satellites, cellular networks or the like as appropriate. Accordingly, remote control of the device may be enabled globally from any location also connected to the same network.

The differential pressure measuring device may be powered, in this exemplary embodiment, via a power supply unit 180 operable to provide operational power.

Optionally, the power supply unit is connectable through the mains using a transformer. Additionally or alternatively, the power supply unit may use a battery operated unit, ensuring lengthy operation periods of at least one year.

Optionally, the battery operated unit is a rechargeable power unit.

It is noted that the differential pressure measuring device may be operable to "shut down" unused electrical components to reduce its power consumption.

Optionally, the differential pressure measuring device may further comprise at least one display unit configured to present associated absolute measured pressures (high and low) and differential pressure. Additionally or alternatively, the display unit may comprise an LCD display supporting touch technology.

Interfacing with the controlling system and the electromechanical components may be performed by wiring, as customary with control systems. Further, the interface of RS485, for example, may be used for interfacing with a programmable logic controller, for various industrial applications.

Optionally, a moisture detection unit (not shown) may be incorporated with the hardware of the differential pressure switch.

Optionally, a temperature detection unit (not shown) may be incorporated with the hardware of the differential pressure switch.

Optionally, the communication unit 150 may support Wi-Fi 802.11b/g/n with FCC compliance. The unit may further be used as an optional method for data back up and as a service platform providing maintenance and upgrade functionality.

Optionally, the processing unit 140 may include a data storage unit operable to provide internal and external data storage functionality for the purposes of data retrieval and analysis. Where appropriate, the communication with the data storage unit may be encrypted.

Figure 3:
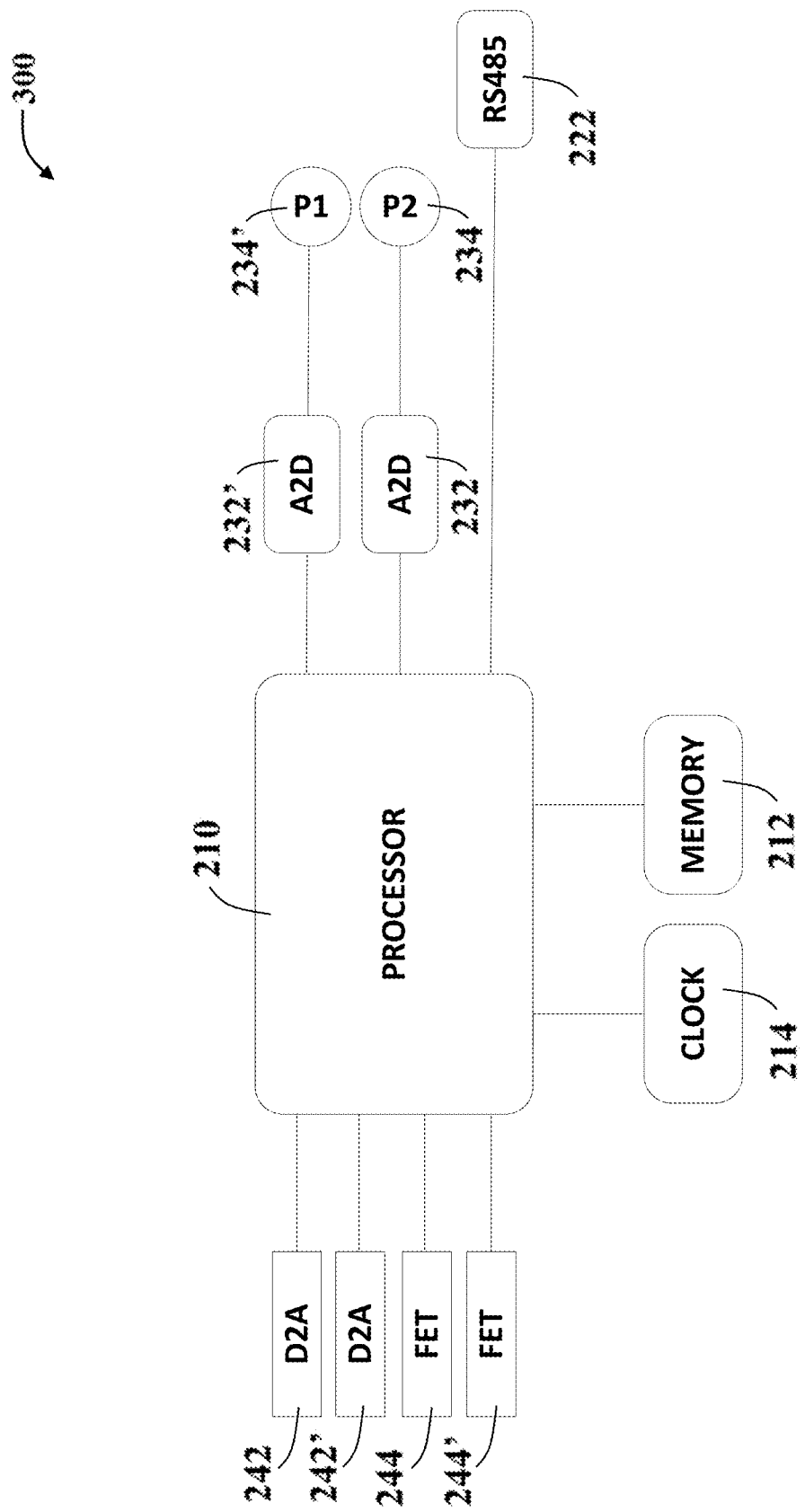
FIG. 3 is a schematic illustration of a differential pressure switching system configured to provide pressure management of a system, according to the presently disclosed subject matter.

Reference is now made to FIG. 3, there is provided a schematic illustration of a differential pressure switching system, which is generally indicated at 300, the system configured to provide pressure management of a piping system, according to the presently disclosed subject matter. The differential pressure system 300, comprising two piezoelectric sensors 232 and 232' configured to convert mechanical pressure into electric voltage and a processor 210. The first piezoelectric sensor 232 connected with a coupler 234 measuring the pressure P1 and the second piezoelectric sensor 232' connected with a second coupler 234' measuring the pressure P2. The processor 210 further comprises a memory 212 and an internal clock 214.

The processor 210 is configured to process two discrete outputs (FET) 244 and 244', and two analog outputs 242 and 242' via the internal clock 214.

It is noted that two discrete outputs 244 and 244' may use a relay operable to maintain either contact position indefinitely without power applied to the coil; a field effect transistor (FET) as a unipolar device FET operable as a voltage controlled device; or a solid-state relay (SSR) operable as an electronic switching device that switches on or off when a small external voltage is applied across its control terminals.

It is noted that the internal clock 214 may be configured to associate a timestamp with each pressure measurement at the first sensing port and at the second sensing port, as described in FIGS. 5A-C, hereinafter. Timestamp, may further be associated with system associated events or of any system recordings.

As appropriate, the analog outputs 242 and 242' are used as transducer outputs for differential pressure, high pressure and low pressure (at least two), and the discrete outputs 244 and 244' serve the differential pressure switch, the high pressure switch or the low pressure switch (at least two).

Figure 4:
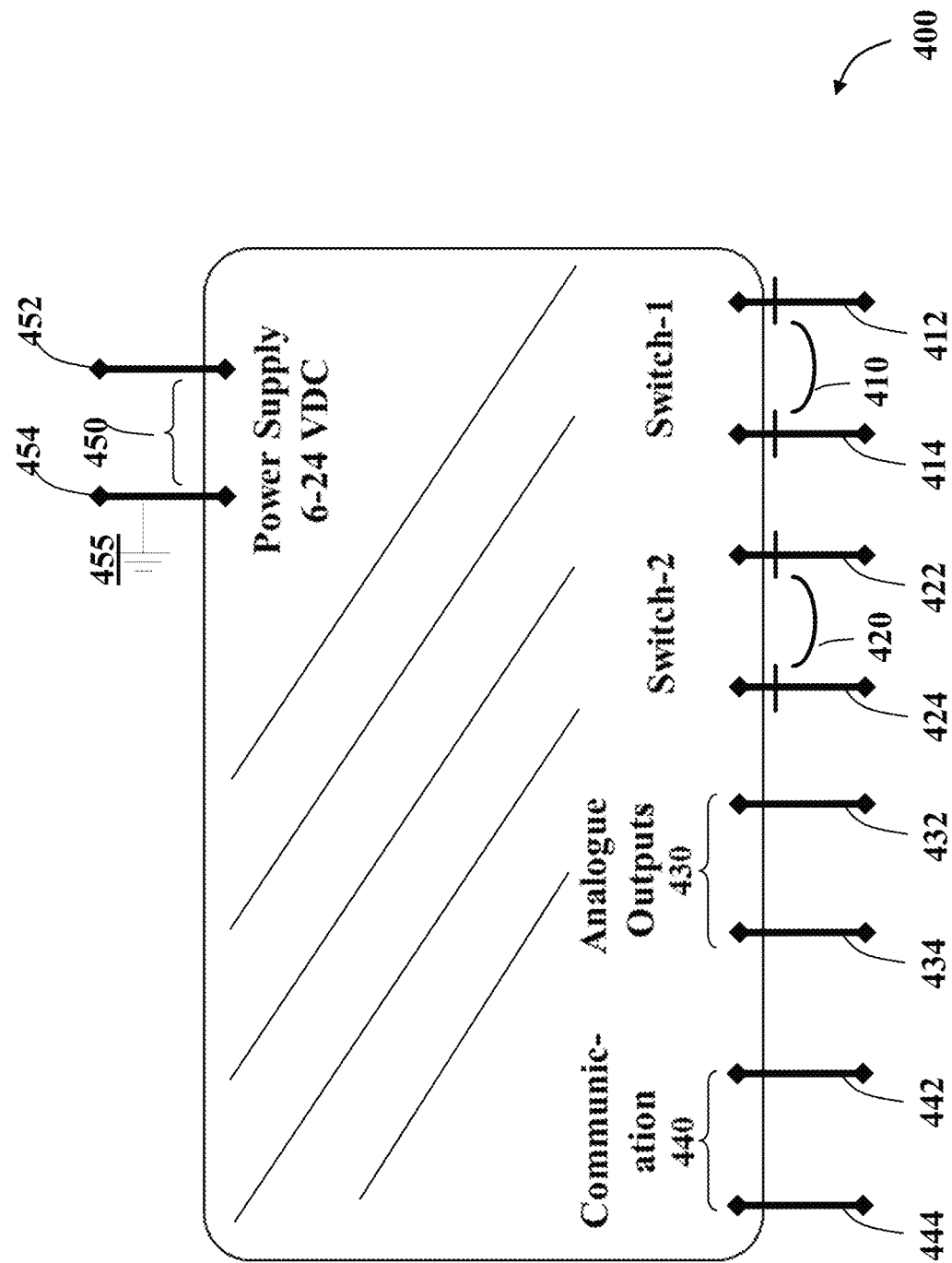
FIG. 4 is a schematic illustration of a pressure measuring device wired interfaces configured to provide pressure management of a system, according to the presently disclosed subject matter.

Reference is now made to FIG. 4, there is provided a possible schematic illustration of external interfaces for a multi-function pressure device, which is generally indicated at 400, the multi-function pressure device configured to provide pressure management of a system, according to the presently disclosed subject matter. The multi-function pressure device 400, comprises a first external interface 410 operable to provide a first control output of a first pressure switch; and a second external interface 420 operable to provide a second control output of a second pressure switch. The first external interface 410 comprising a first contact 412 and a second contact 414 and the second external interface 420 comprising a first contact 422 and a second contact 424;

Further, a third external interface of analog output 430 is operable to provide at least one analog output configured to communicate output measurements pertaining to at least one of a first port pressure measurement, a second port pressure measurement and a differential pressure between the first port and the second port. The analog output interface 430 comprising a first output contact 432 which in combination with the common output contact 454 provides a first analog output, a second output contact 434 which in combination with the common output contact 454 provides a second analog output.

It is noted that the first pressure switch 410 and the second pressure switch 420 are operable to connect according to the multi-function pressure device configuration. Accordingly, if the system is configured as a pressure differential switch (DPS), then the first switch 410 may be operable, and if the system is configured as a pressure switch (PS), then the second switch 420 may be operable, otherwise none of the switches are operable.

It is noted that if backwashing is operable, then the first switch 410 and the second switch 420 may be configured to interface with a DPS wash valve/a DPS wash master valve (as described in FIG. 7C, hereinafter). Additionally, various types of switches may be used as external interfaces, such as a latching relay operable to maintain either contact position indefinitely without power applied to the coil; a field effect transistor (FET) as a unipolar device FET operable as a voltage controlled device; a solid-state relay (SSR) operable as an electronic switching device that switches on or off when a small external voltage is applied across its control terminals.

It is further noted that when backwashing is operable, the multi-function pressure device may provide differential pressure services according to the differential pressure device (DPS) functionality.

Optionally, the analog output interface may be operable to output any two outputs of differential pressure transducer, pressure of the high port and pressure of the low port configurable via the setup of the software application. Accordingly, the analog output external interface 430 may be configured to transmit signals according to a preconfigured output standard, such as 4-20 milliamps, 0-5 volts DC, 1-5 volts DC, 0-10 volts DC, 1-10 volts DC or other acceptable standards.

The communication bus interface 440 comprises a first wire 442 and a second wire 444, in which the communication bus may be configured to enable wired communication, conform to the communication protocol of RS485, for example.

It is noted that the RS485 is a serial communication method for computers and devices configured to be used over long distances and operable to communicate with a programmable logic controller (PLC). Additionally of alternatively, the communication bus 440 may be allocated for future use, interfacing with additional communication protocols, for example.

The pressure measuring device 400 may further comprise a power supply connector 450, supporting voltage levels of 6 volts DC to 24 volts DC via the first wire 452 and a second wire 454 coupled to ground 455. Optionally, the second wire 454 may serve as a common output contact.

System Backwashing/Flushing:

A flow restricting device, such as a filter, may be used in a piping system to collect or gather particles from the incoming flow and ensure the well-functioning of the system. The current disclosure provides monitoring tools configured to measure the high pressure at the entry port and the low pressure at the exit port. Where appropriate, the differential pressure switch may be operable to monitor flow restriction when the measured pressure difference is greater or lower than a pre-configured threshold value.

Accordingly, cleaning is a necessity when filters become clogged to avoid damages. One of the best ways to clean a system's filter is to backwash it, by reversing the flow and increasing the velocity at which water, for example, passes back through the filter.

Figure 5A:
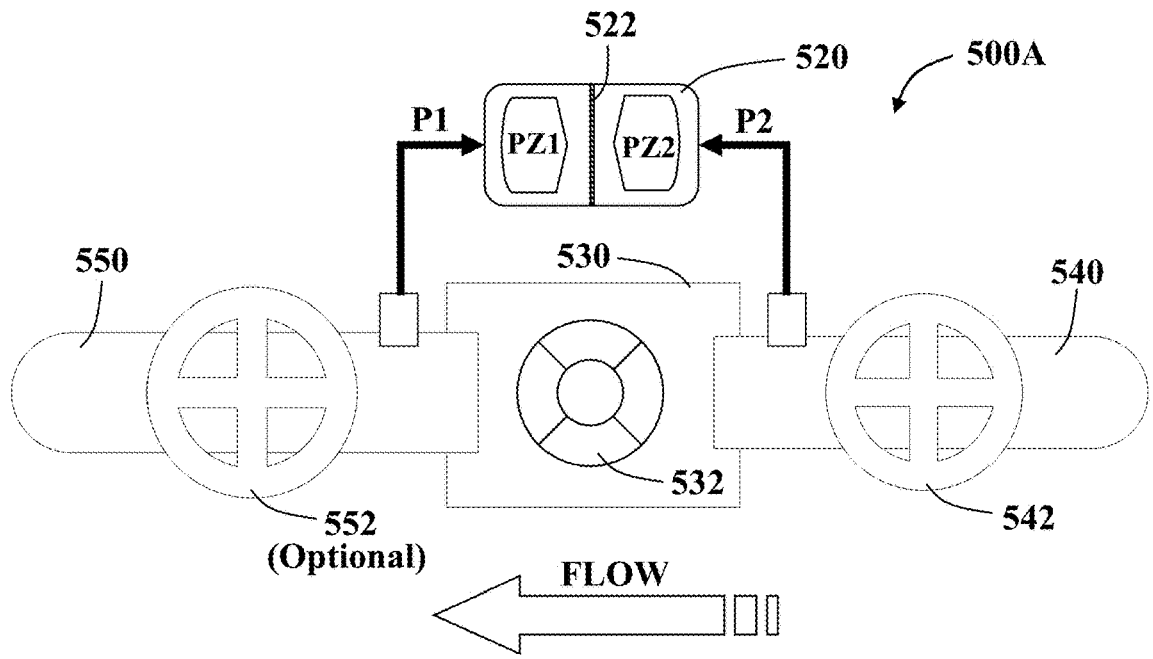
FIG. 5A is a schematic illustration of selected components of a piping segment installable with a differential pressure measuring device operable to function variously as a differential pressure switch.
Figure 5B:
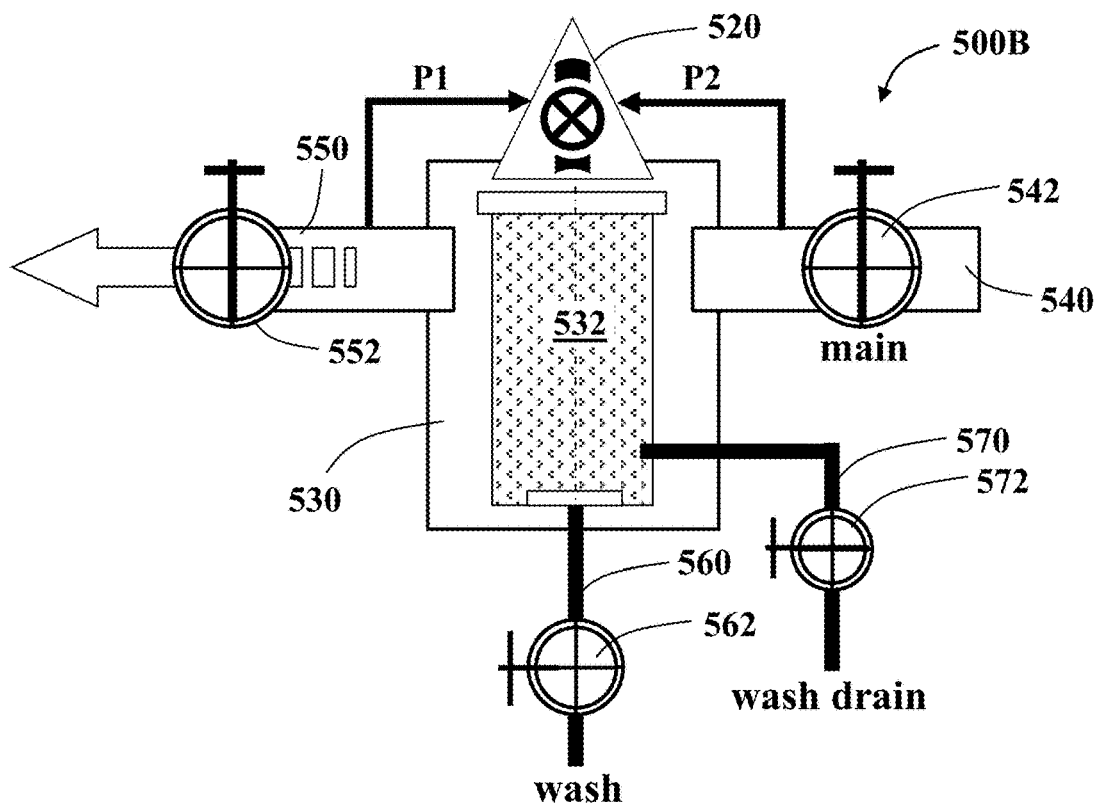
FIGS. 5B-C are schematic illustrations showing selected components of a piping segment installable with a differential pressure measuring device configured for backwashing of a clogged flow restricting device, according to the presently disclosed subject matter.

FIG. 5A provides a schematic illustration of a system segment including a pressure measuring using piezoelectric technology and associated filtering component, and FIG. 5B provides the illustration of possible backwashing of a clogged filter.

Reference is now made to FIG. 5A, there is provided a schematic illustration of selected components of a piping segment installable with a differential pressure measuring device operable to function variously as a differential pressure switch, for example, which is generally indicated at 500A, the piping segment may be configured for gas, liquid flow or solids flow (such as in sand/cement pumps) through a flow restricting device such as a filtering component with a main valve and a secondary optional valve, according to the presently disclosed subject matter.

The schematic illustration 500A of the piping segment may include a piezoelectric differential pressure measuring device 520, operable to provide absolute and differential pressure measurements, installed over a filtering component 530 comprising a filter element 532, an entry port segment 540 with an associated entry valve 542, the main valve, and an exit pipe segment 550 with an associated exit valve 552 (optional).

The piezoelectric differential pressure measuring device 520 may include a first piezoelectric sensor PZ1 connectable to the low pressure piping segment and a second piezoelectric sensor PZ2 connectable to the high pressure piping segment, where the pressure difference is the difference between the measured high pressure P2 and the measured low pressure P1.

It is noted that the two piezoelectric pressure sensors are each introduced in a separate compartment, separated by an internal wall 522, for example. As temperature may have high effect on pressure accuracy, it is desire to have the same temperature with these compartments. This may be achieved by bringing the two components to be physically close to one another. Additionally or alternatively, the two piezoelectric components may use a thermal bridge to equate the temperature, or an additional correcting measure associated with temperature effect may be necessary.

As appropriate, the differential pressure measuring device 520 may include hardware components such as a data processor operable to access and analyze measured pressure data, a communication unit operable to communicate with PLCs and may further use, for example, various communication protocols such as Wi-Fi, Bluetooth, ZigBee, Thread, NFC and the like, a data logger and more, as described hereinabove in FIG. 2.

Reference is now made to FIG. 5B, there is provided a schematic illustration, which is generally indicated at 500B, showing selected components of a piping segment installable with a differential pressure measuring device, the piping segment is configured for backwashing (flushing) of a clogged flow restricting device, according to the presently disclosed subject matter.

The schematic illustration 500B of the piping segment may include a piezoelectric differential pressure measuring device 520, operable to provide absolute and differential pressure measurements, a filtering component 530 comprising a filter element 532, an entry port segment 540 with an associated main entry valve 542, an exit port segment 550 with an associated exit valve 552, a wash piping segment 560 and associated wash valve 562, a wash-drain piping segment 570 with an associated drain valve 572.

As appropriate, when the differential pressure as measured via the piezoelectric sensors of the differential pressure measuring device, is greater than a pre-determined threshold pressure value, it may clearly indicate a need for backwashing of the flow restricting device.

It is noted, that for a case of a filter, the high pressure may cause damages and may tear the filter apart.

The backwashing process actions: closing the main entry valve 542, to stop the regular flow; opening the wash drain valve 572; and further opening the entry wash valve 562; to enable washing of the filtering element 532 by providing reverse flow from the piping segment 560 through the filtering element 532 and draining via the piping segment 570.

The exit valve 552 will be closed to avoid any dirt or clogged materials, while backwashing, entering into the piping system.

Upon completion of the backwashing, the entry wash valve 562 and the wash drain valve 572 are closing to allow opening of main entry valve 542 and exit valve 552 and resume system function.

It is noted that the backwashing process is automatically controlled and may be determined for a specific time duration.

Figure 5C:
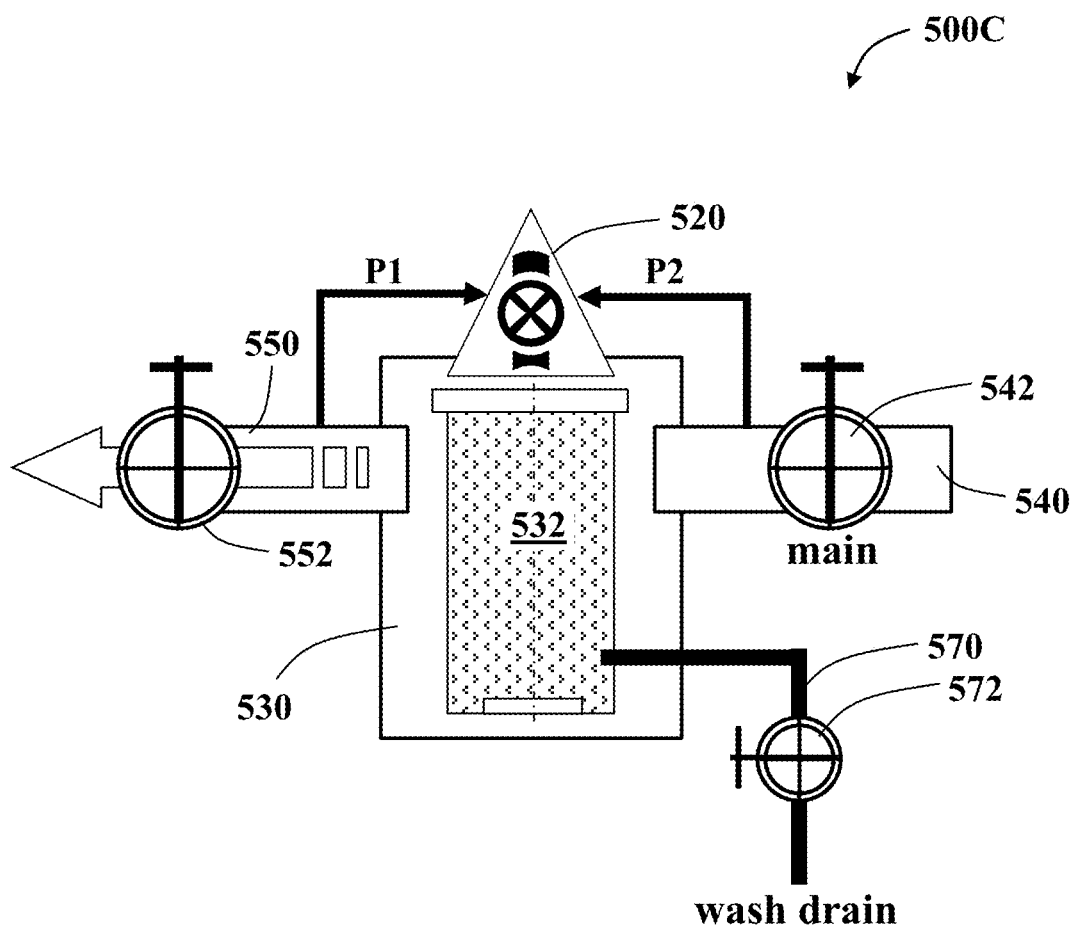

Another possible backwashing configuration embodiment is illustrated in FIG. 5C, enabling to backwash by closing the exit valve 552, enabling flow into the piping segments via the main entry valve 542 of piping segment 540. The flow is further drained after backwashing via the piping segment 570, when the wash drain valve 572 is open.

Figure 5D:
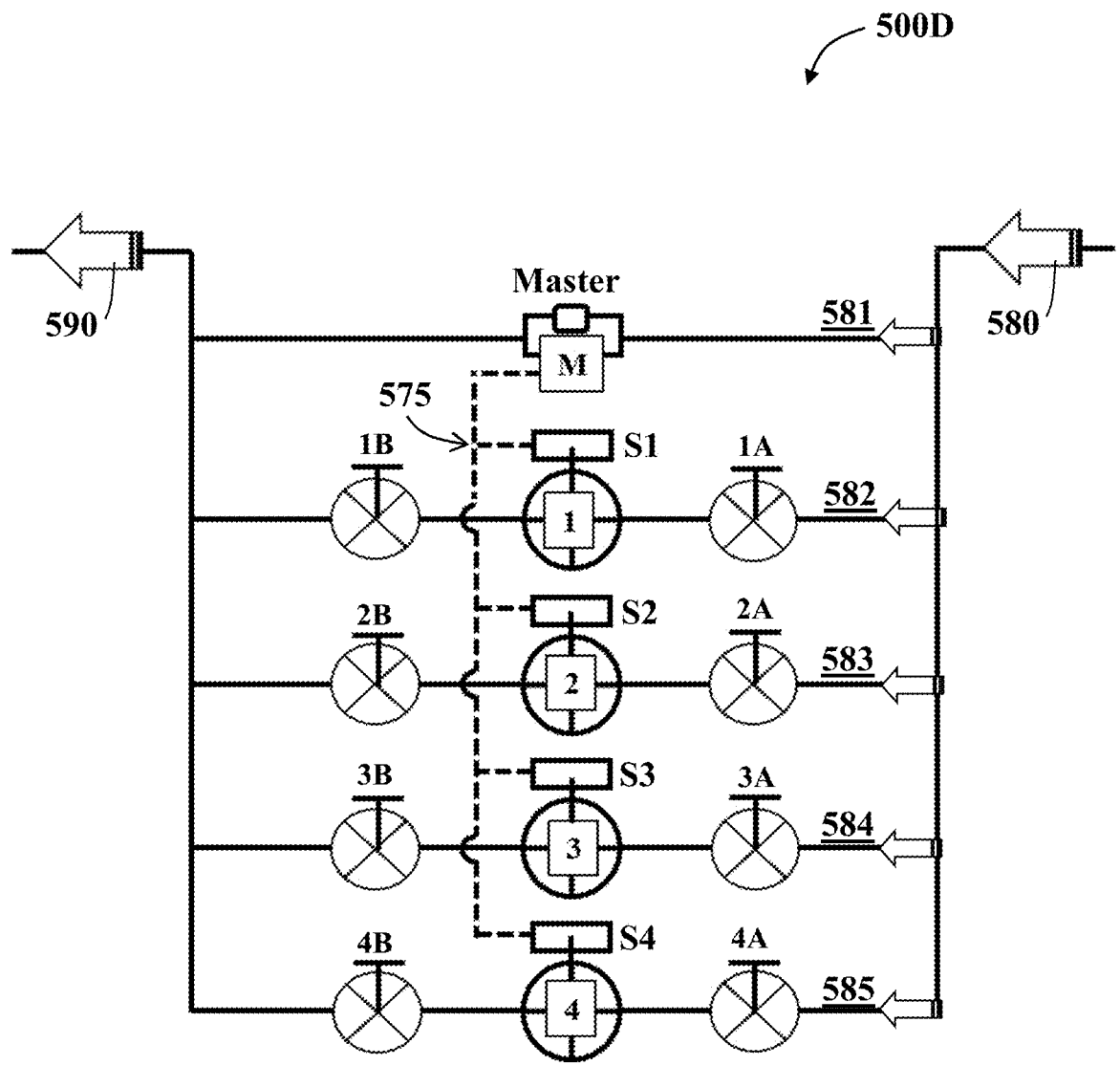
FIG. 5D is a schematic illustration of selected components of a piping segment installable with filtering assembly and associated differential pressure measuring devices.

Reference is now made to FIG. 5D, there is provided a schematic illustration, which is generally indicated at 500D, showing selected components of a piping segment installable with a filtering assembly and associated master differential pressure measuring device, enabling backwashing sequence while system is fully operational except the piping segment being flushed.

The schematic illustration 500D of the piping segment includes a master differential pressure measuring device M1 operable as a DPS Master, an entry piping segment 580 connectable to an exit piping segment 590 via separate piping segments 581 through to 585. Each piping segment 582 through to 585, includes a filtering element (1 through 4, for example), an associated entry valve (1A through to 4A), an associated exit valve (1B through to 4B) and a slave pressure device. The filtering elements (1 through 4, for example) are controlled for backwashing sequence for a time duration, by the master differential pressure measuring device, based upon a preconfigured pressure difference value. Once the pressure difference exceeds the upper level of the preconfigured pressure difference value, a backwashing sequence may be triggered by the master device M1, for a time duration for each specific piping segment.

Alternatively, the backwashing sequence may be triggered according to a predefine backwashing schedule.

It is noted the Master device is connectable to each slave pressure device via an external interface set 575, comprising a wired interface for each slave pressure device, separately.

It is further noted that the master device M1 may be located physically at a halfway point between the slave devices, to maximize signal strength and therefore line distance and speed.

Figure 6:
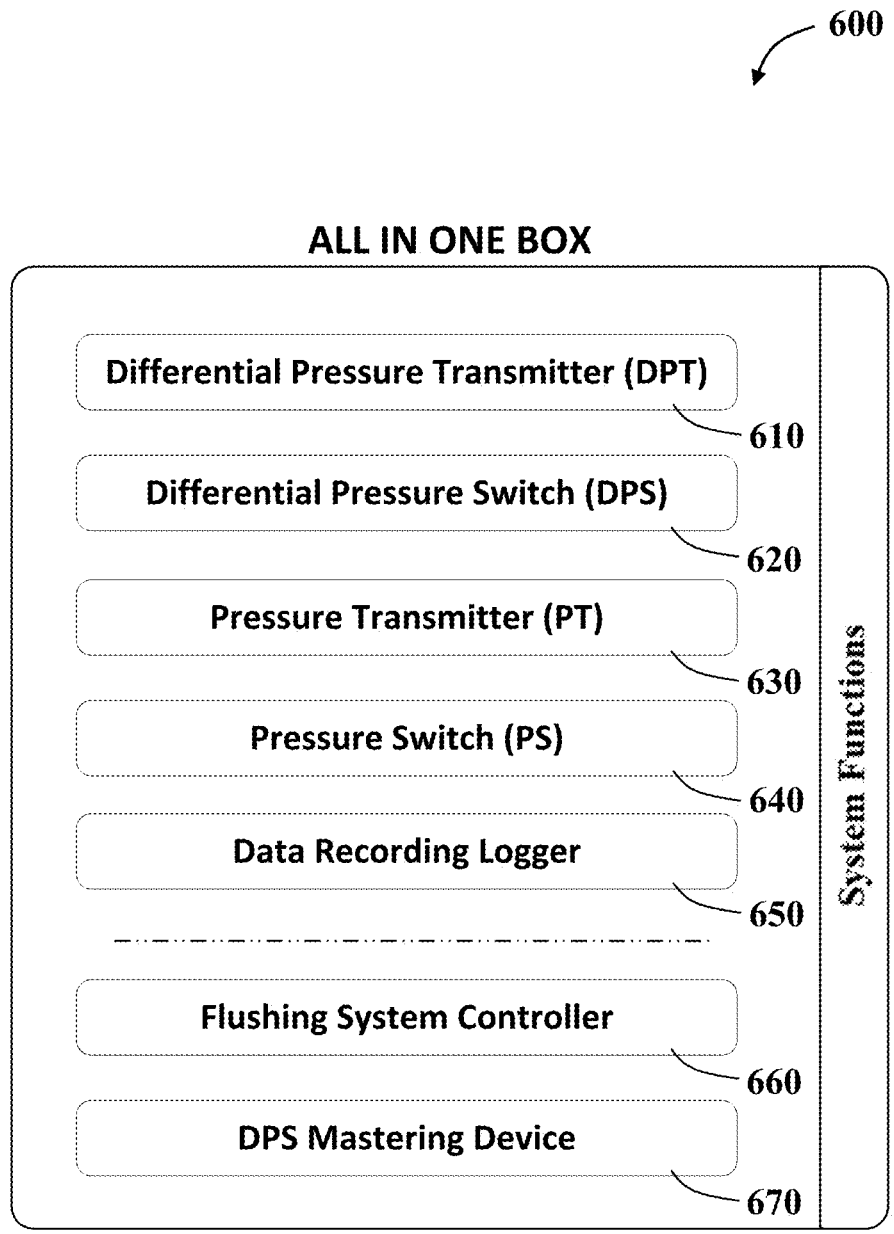
FIG. 6 is a schematic illustration showing selected possible functions of a piezoelectric multi-function pressure device, according to the presently disclosed subject matter.

Multi-Functionality:

Reference is now made to FIG. 6, there is provided a schematic illustration, which is generally indicated at 600, showing selected possible functions of a piezoelectric multi-function pressure device, according to the presently disclosed subject matter.

It is specifically noted, the pressure monitoring device of the current disclosure may be operable to function as a multi-functional measuring device. Thus, the presently disclosed device and may be used and further configured to function as various products having an integral arrangement and providing an "all in one box" product.

The schematic illustration 600 of the piezoelectric pressure device provides the various functionalities encapsulated in one single box—"all in one box" product. The piezoelectric pressure device may be used variously as a pressure measuring device such as a differential pressure switch (DPS) 610, a differential pressure transducer (DPT) 620, a pressure transducer (PT) 630, a pressure switch (PS) 640 and a data recording logger 650.

As appropriate, when the piezoelectric pressure device is configured as a differential pressure switch (DPS) 610, the device is operable to measure simultaneously the high pressure at the entry point of the flow restricting device (e.g. a filter) and the low pressure at the exit point from the flow restricting device, or vice versa. When the measured pressure difference is greater or lower than a pre-configured threshold value, the device may trigger a response procedure and change status of an internal switch from open to close (for an NO switch). Alternatively, the device may change status of the internal switch from close to open (for an NC switch). This switch change may drive a solenoid. Additionally or alternatively, the switch change may send an input to a programmable logic controller (PLC) as part of a larger flow monitoring system.

It is noted that when the multi-function pressure device, functions as a differential pressure switching device (DPS), then the device may determine a pressure difference between the pressure measured at the first pressure sensing port and the pressure measured at the second pressure sensing port. If the pressure difference value is below a pressure difference threshold then the device is operable in a conformable pressure range and is configured to communicate the pressure event externally as On/Off. If the pressure difference value is greater than the pressure difference threshold, then the pressure the device may be configured to communicate the pressure event and further activate a response procedure.

It is noted that the device may further communicate regularly, depending upon device configuration, the pressure measured at the first pressure sensing port, the pressure measured at the second pressure sensing port or acombination thereof.

As appropriate, when the piezoelectric pressure device is configured as a differential pressure transducer (DPT) 620, the device is operable provide output an analog signal according to pre-configured output standard selected from 4-20 milliamps, 0-5 volts DC, 1-5 volts DC, 0-10 volts DC or 1-10 volts DC (user defined) or other know standard. The analog output is proportional to the pressure difference measured and the full measurement span defined by the user. Additionally or alternatively, the output analog signal may be used by a programmable logic controller (PLC) as part of a larger flow monitoring system.

As appropriate, when the piezoelectric pressure device is configured as a pressure transducer (PT) 630, the device is operable to provide output as an analog signal according to the selected standard (as mentioned hereinabove) proportional to the pressure measured at the low/high (first/second) pressure points. Additionally or alternatively, the output analog signal may be used by a programmable logic controller (PLC) as part of a larger flow monitoring system.

As appropriate, when the piezoelectric pressure device is configured as a pressure switch (PS) 640, the device is operable to provide output as On/OFF signal according to the set point and pressure measured at the low/high (first/second) pressure points. Additionally or alternatively, the output signal may be used by a programmable logic controller (PLC) as part of a larger flow monitoring system.

It is noted that when the multi-function pressure device, functions as a pressure switching device (PS) or as a differential pressure switching (DPS) device, then the device may obtain a pressure measurement from the first pressure sensing port or at the second pressure sensing port or both. If the pressure measurement value is either greater or lower (on/off and configured) than a pressure threshold, this pressure event may be communicated out as on/off output of the device, and further, a response procedure may be activated.

Accordingly, the response procedure activated is associated with the various functional configuration of the device and may include a warning message, an error message, change status and state or drive a solenoid device.

It is noted that pressure switches may commonly use the hysteresis switching function, included for all switch variants, whether mechanical or electronic. Hysteresis is generally associated with the difference between the switch set-point and the reset point. In the case of mechanical switches, the hysteresis is usually predefined by the manufacturer, while in the case of electronic switches it is often configurable. Further, usage of the hysteresis function is essential, since if the switch set-point and the reset point are set to the same value, the system being controlled would oscillate and become unstable.

For example, a pressure switch may be used to monitor and control a pump in a water system. The pressure switch may be configured to activate the pressure switch output at a set-point of 6 bar, say, when the system pressure is exceeded, and thus stop the pump. Subsequently, should the pressure drop below 6 bar (reset point), the switch output may further be configured to deactivate, and thus the pump may be restarted.

Furthermore, the piezoelectric pressure device of the current disclosure may function as a recording data logger 650; as a backwashing (flushing) system controller 660 and as a differential pressure switch (DPS) mastering device 670.

As appropriate, when the piezoelectric pressure device is configured as a data recording logger 650, the device is operable to collect and record the pressure data as determined hereinabove, referring to DPT, DPS, PT and PS functionality, including applicable switching schedules, setup changes and the like.

As appropriate, when the piezoelectric pressure device is configured as a backwashing (flushing) system controller 660, the device is operable to activate the relay according to a certain script. Additionally, the device may further be operable to send relevant error messages through the communication unit (Bluetooth) remotely via cellular GSM network.

Regarding the functionality of "DPS Master", it is noted that commonly, in a master-slave arrangement when one device labeled "the master" initiates all communication activity, the master device itself controls the slave devices. Within the current context, the master device is typically centrally located along the set of RS-485 wires, so it would be two slave devices located at the physical end of the wires that would provide the termination. In such arrangements, the master device would be better located physically at a halfway point between the slave devices, to maximize signal strength and therefore line distance and speed, as indicated in FIG. 5D.

Calibration:

Calibration is often needed to improve sensor output accuracy. Generally, the calibration establishes the relationship between the physical measurement variable and the signal variable. A sensor may be calibrated by applying a number of known physical inputs and recording the response of the system, thus a model of the sensor law may then be computed. A set of measures may be performed with different pressures applied to a pressure sensor in a specific range, and the voltage output may be recorded for each pressure applied.

A linear system may be presented in a form of a straight line having an equation, such as Y=aX+b. A system with a more complex law may need more calibration points. The Least Mean Squares (LMS) algorithm may be a solution often used to find a function which best fit a data set.

The Wheatstone bridge is one of the most sensitive and precise methods of measuring small changes in resistance, thus, operable to enable calibration of various devices. The Wheatstone bridge is a four armed bridge circuit, each arm is having a resistor, which may be fixed or variable. It is used to measure an unknown resistance by balancing two arms of the bridge, one of which contains the unknown resistance. In practical terms, the Wheatstone bridge may incorporates one or more electrical transducers that change resistance as a result of an environmental change or input, such as temperature, pressure, stress, strain, light and the like. This change is sensed by the circuitry of the Wheatstone bridge which provides a useable electrical output (voltage) representative of the input.

Specifically, regarding the pressure measuring device disclosed comprises two separate piezoelectric sensors configured to measure absolute pressure. The piezoelectric sensors are generate electric signals processed by the electronic hardware and software of the device, thus the calibration is crucial to due to inconsistency of the piezoelectric sensor performance. Moreover, various parameters like Zero, Span, Linearity and temperature coefficient may affect the sensor's performance, thus each sensor requires calibration to provide accurate reading and for trusted operation.

The pressure measuring device may provide two calibration options. The first option is performing the calibration during the manufacturing of the device. Additionally or alternatively, this option is also available for the operator during the operation phase.

It is noted that the pressure measuring device is operable for outdoor operating conditions without any additional environmental protection or shielding. Further, the working temperature span may range from −10 to 90 degrees centigrade with no performance degradation. Additionally, the pressure measuring device complies with the requirements of IP 67/68 waterproof grade connectors to provide long term durability.

Figure 7A:
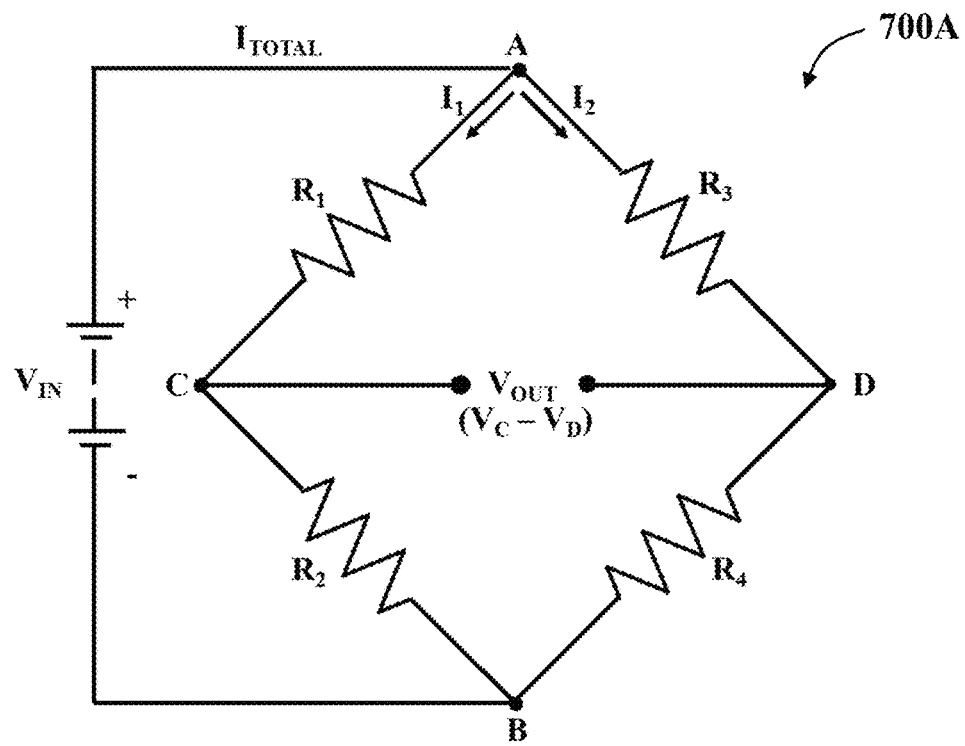
FIG. 7A shows a Wheatstone bridge configuration representing the fundamental concept having two voltage dividers.

Reference is now made to FIG. 7A, there is provided a Wheatstone bridge typical configuration, which is generally indicated at 700A, representing the fundamental concept with the bridge having two input terminals and two output terminals consisting of four resistors configured in a diamond-like arrangement, thus having two voltage dividers. With the configuration 700A, the two voltage dividers are both fed by the same input and the circuit output is taken across the middle of the dividers, as indicated by $V_{OUT}$.

In its classic form, a galvanometer which is a very sensitive DC current meter, is connected between the output terminals, and is used to monitor the current flowing from one voltage divider to the other voltage divider. If the two voltage dividers have exactly the same resistance ratio $(R_1/R_2=R_3/R_4)$, then the bridge is said to be balanced and no current flows in either direction through the galvanometer $(I_1=I_2=0)$. If one of the resistors changes in value, even small change, the bridge becomes unbalanced and current $(I_1>0, I_2>0)$ will flow through the galvanometer, which becomes a very sensitive indicator of the balance condition.

Figure 7B:
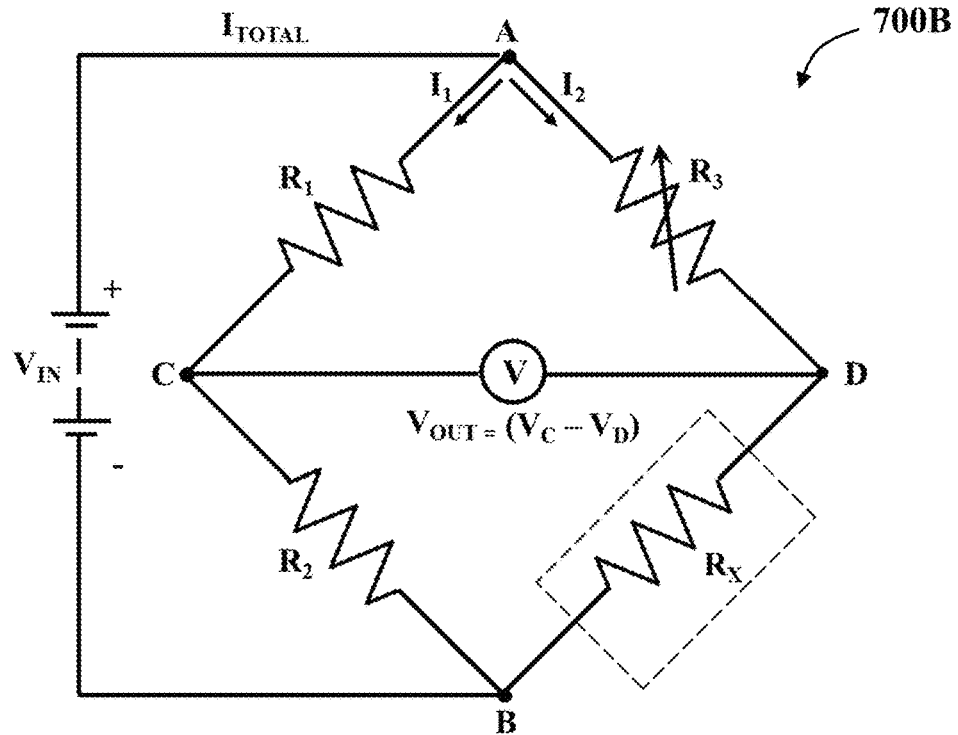
FIG. 7B shows a classic Wheatstone bridge configuration consisting of three fixed resistors and a fourth variable resistor (transducer or sensing element)

Reference is now made to FIG. 7B, there is provided a classic Wheatstone bridge configuration, which is generally indicated at 700B, the Wheatstone bridge configuration consists of four resistors, three of which are of fixed value and a fourth resistor (transducer or sensing element) which is variable.

With the Wheatstone bridge configuration 700B, by replacing R4 with a resistance of a known or unknown value in the sensing arm of the Wheatstone bridge corresponding to $R_X$ and adjusting the opposing resistor, $R_3$ to "balance" the bridge network, will result in a zero voltage output. Thus, the balance occurs when:

$$\frac{R_1}{R_2} = \frac{R_3}{R_x} = 1 \text{(BALANCED)}$$

The Wheatstone bridge equation required to give the value of the unknown resistance, $R_X$ at balance is given as:

$$V_{OUT} = (V_C - V_D) = (V_{R2} - V_{Rx}) = 0$$

$$R_C = \frac{R_2}{R_1 + R_2} \text{ and } R_D = \frac{R_x}{R_3 + R_x}$$

$$\text{At Balance: } R_C = R_D, \text{ so } \frac{R_2}{R_1 + R_2} = \frac{R_x}{R_3 + R_x}$$

$$R_2(R_3 + R_x) = R_{x4}(R_1 + R_2) \text{ and}$$

$$R_x = (R_2 R_3)/R_1 = R_X$$

Where the resistors values of $R_1$, $R_2$ and $R_3$ are known or may have preset values.

It is noted that piezoelectric elements are designed to measure pressure. Variously, the pressure and temperature may have effect on measurement accuracy. The pressure effect is mostly linear throughout measurement, but the temperature effect varies in a non-linear manner and may not be characterized with a first order linear function. Thus, if two piezoelectric components are used for the pressure differential switch, specifically, when the first piezoelectric component is connected to the high pressure port and the second component is connected to the low pressure port, a correcting measure associated with temperature effect and variations, is necessary to enable high accuracy of pressure measurements.

Thus, and in particular it is noted that regularly, the output measurement is a function of pressure and temperature, with the temperature having high effect on accuracy of the measurement, thus a third piezoelectric component may be introduced within the Wheatstone bridge, thus:

$$V_{out-Piezo}(\text{normal state}) = VPN = f(\text{Pressure}) + f(\text{Temp.})$$

In the specific case, in which the piezoelectric component is isolated from any pressure effect, such as by using molding technology for encapsulating the measuring components, then:

$$V_{out-Piezo}(\text{special state}) = VPS = f(\text{Temp.})$$

It is noted that the two piezoelectric components are having the same temperature. This may be achieved by bringing the two components to be close physically to one another. Additionally or alternatively, the two piezoelectric components may use a thermal bridge to equate the temperature, thus:
$R_1 = R_3 = R$; $R_2 = VPN$; and $R_x = VPS$
resistor's ratio is: $R_1 = R_3 = R$; $R_2 = VPN$; and $R_x = VPS$ $$\frac{R_1}{R_2} = \frac{R_3}{R_x} \text{ then, } \frac{R}{VPN} = \frac{R}{VPS} \text{ and,}$$

$$\frac{R}{[F(P) + F(t)]} = \frac{R}{F(t)} \text{ then, } F(P) + F(t) = F(t), \text{ and } F(P) = 0$$

Thus, the third piezoelectric component may reduce significantly the effect of the temperature on accuracy of measurements.

Figure 7C:
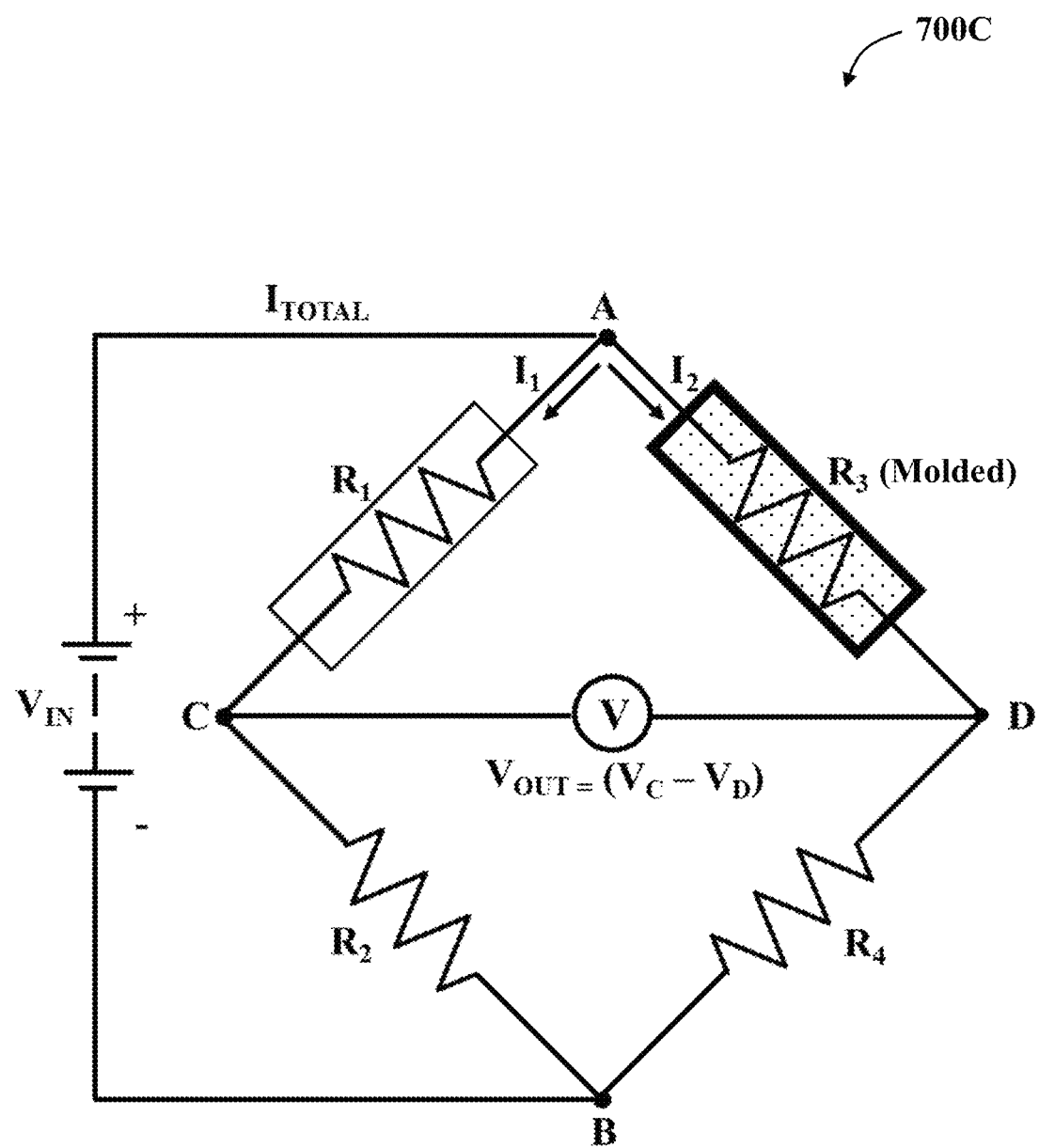
FIG. 7C shows a Wheatstone bridge configuration consisting of two fixed resistors a piezo-resistive sensor effected only by temperature and a piezo-resistive sensor effected by pressure and temperature configurable to eliminate temperature effect on device accuracy.

Reference is now made to FIG. 7C, there is provided a Wheatstone bridge configuration, which is generally indicated at 700C, representing one possible mechanism operable to eliminate the temperature effect on calibrating the multi-function pressure device of the current disclosure. With the configuration 700C comprises two piezoelectric resistors and two regular resistors. The first resistor, $R_1$ is the first piezoelectric element, which is connectable to the pressure side, thus exposed to pressure and temperature effects. The third resistor $R_3$, is the second piezoelectric element which is molded, disconnected from the pressure side such that the resistor is exposed to temperature effect only. The second resistor $R_2$ and the fourth resistor $R_4$ are regular Wheatstone bridge resistors.

It is noted that the piezoelectric element is a variable resistor, with resistance varies according to pressure and temperature.

Accordingly, such Wheatstone bridge configuration allows to reduce significantly the temperature effect, enabling accurate pressure measurement using two piezoelectric sensors.

Figure 7D:
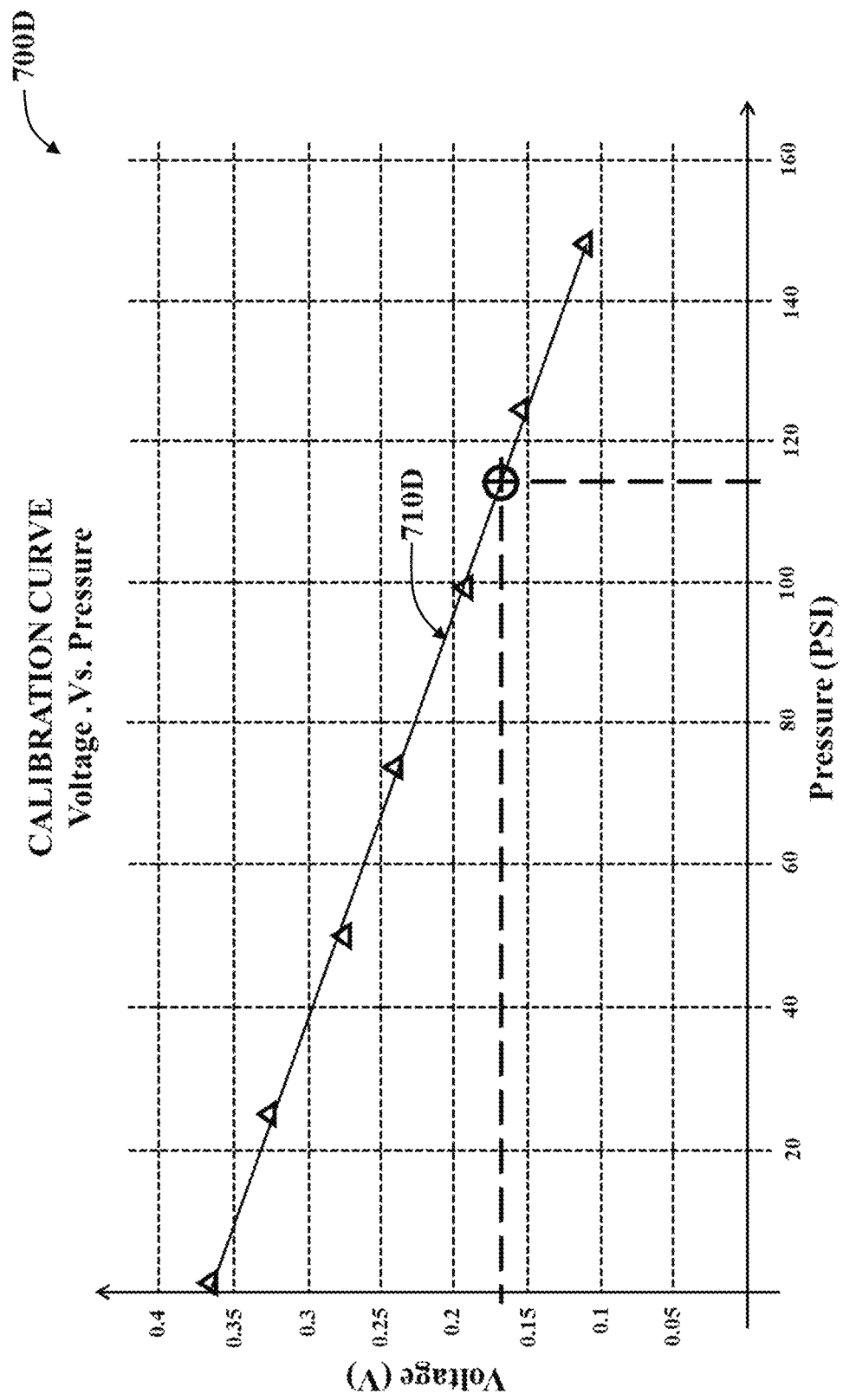
FIG. 7D shows a calibration curve of a Wheatstone bridge configuration as a pressure transducer.

Reference is now made to FIG. 7D, there is provided a calibration curve of a Wheatstone bridge configuration as a pressure transducer, which is generally indicated at 700D. As illustrated, to calibrate a Wheatstone bridge as a pressure transducer, a series of known pressure differences may be applied to the sensing element (diaphragm, strain-gauge, piston, piezoelectric element and the like). The output voltage ($V_{OUT}$) may be measured and recorded of $V_{OUT}$ values versus pressure and may be presented as a linear graph 710D. Such a linear graph, as an example, is referred to as a calibration curve.

When an unknown pressure is subsequently applied and the output voltage read, the calibration curve of $V_{OUT}$ vs. Pressure may be used to determine the actual pressure. The linear graph 710D is such an example of a calibration curve based on an actual micro-pressure sensor utilizing a Wheatstone bridge, as described hereinabove. The graphic presentation 700D illustrates how to read the calibration curve. For example, if an output voltage of 0.17 V is read, the corresponding pressure is approximately 113.5 psi.

It is noted that the multi-function pressure device is operable to manage pressure control in a system comprising at least one flow limiting device such as a valve or a filter. The device may be configured functionally via the associated setup configuration interface, as exemplified in FIGS. 12A-G, hereinafter.

Additionally, the active type of the device may be determined, selected from a group consisting of: a differential pressure transducer (DPT); a differential pressure switch (DPS); a pressure switch (PS); a pressure transducer (PT); a data logger and combinations thereof. Accordingly, the device may be calibrated to provide accurate functionality. Furthermore, calibration may use a calibration curve as described hereinabove, associated with the device. Additionally or alternatively, the system may be operable to gather data from a plurality of pressure measuring devices and construct the associated calibration curve by using data obtained from the plurality of pressure measuring devices considering various device parameters such as calibration history, age of device, operational parameters (pressure range, temperature, humidity) and the like.

The Software Module:

The software module, set to execute on a pressure measuring device in any of its possible setup configurations, is operable to communicate with a software application set to execute on a mobile device such as a smartphone, a tablet and the like, as may be described in FIG. 10, hereinafter. Additionally, the software module may further be configured to communicate with a remote module operable on a centrally managed environment.

The software application may be used as the user interface to enable configuration of the various pressure measuring settings and further allow the display of associated measured data, log information and more. It is noted that the software application may be developed using various development platforms to enable the software application to execute on Android devices. Additionally or alternatively, the software application may be developed for Apple devices using iOS operating system. Furthermore, use of a cross platform development may enable developing the software application to be operable to execute on mobile devices of Android or iOS (for Apple devices).

The disclosed system is designed to answer high reliability requirements combining electronics and the software module in a one box packaging such as a molded case, for example, enabling the system to be operable in extreme environmental conditions. It is noted that high reliability may further be achieved by providing an encapsulated product with no moving mechanical parts such as mechanical levers, springs, pistons, diaphragm and the like as known with prior art systems.

Using of the software module combined with the device electronics, the system may be operable to support various functional needs in one box, and may be flexible in its target configuration. The system may be configured, via the software module, to enable or disable functions compatible with a pressure meter; a pressure transmitter; a pressure switch; a differential pressure switch; a data logger functionality; and a filter flushing controller.

Optionally, the system is operable at a wide adjustable working pressure range of −10 to 100 bars (minus 10 to 100 bars), by using the correct piezoelectric component.

Optionally, the system is operable at a high level of accuracy with deviation of up to 0.25% Of Full Scale (OFS).

Optionally, the system is configured to modify and update set points, determining level of alerting and functional activation, using the internal software module.

Furthermore, the system may be remotely configurable and operable to customize customer system functional requests. Additionally, the system may support remote software upgrade, automatically or upon user request.

Optionally, the functional configuration and software upgrade may be enabled according to a specific operating license.

Additionally or alternatively, the software application or may use a web interface as required for the various system options.

It is noted that for the software of the server side for networked distributed systems, as described in this specification and according to current disclosure, may use various development platforms to make the server software operable on various platforms such as Linux, Windows and the like.

It is noted that the server side of the software module may allow the capture of pressure data, and may store the data locally or remotely, perform communications tasks, data analysis, send notifications and messages and communicate with the user to enable monitoring of pressure distribution maps and the like.

It is further noted that the client side of the software module may support a user interface allowing the configuration of system settings, scheduling and recommendations.

Figure 8:
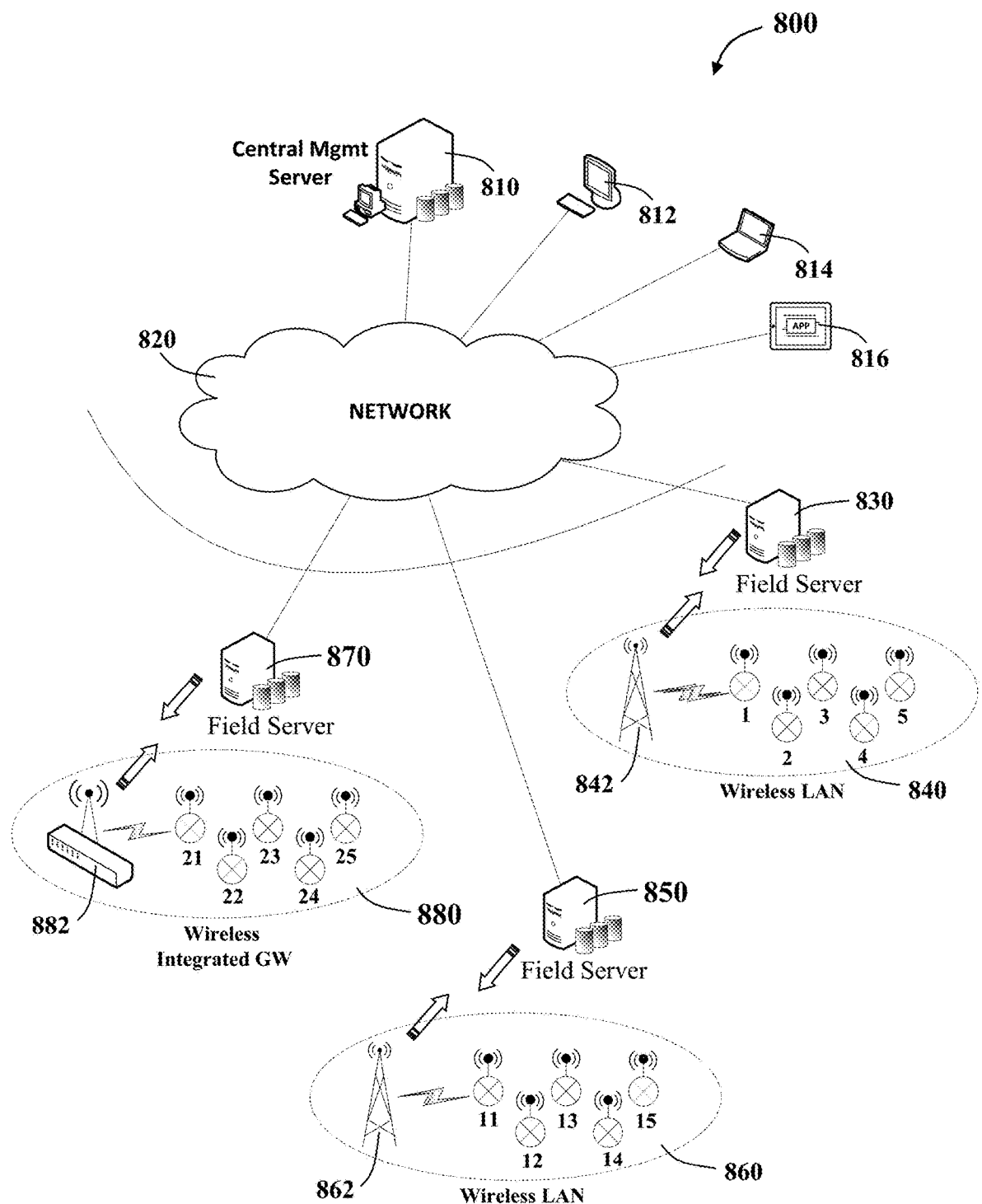
FIG. 8 is a schematic illustration of a networked system configuration consisting of several field networks, each representing a multi-filter environment, a plurality of pressure measurement devices controlled by a field server and centrally managed.

Management of a Network Deployment:

Reference is now made to FIG. 8, there is provided a networked piping system configuration, which is generally indicated at 800, the networked piping system configuration consists of several field networks, each representing a multi-filter environment, a plurality of pressure measurement devices controlled by a field server and centrally managed. The network piping system 800 may include a central management server managing a plurality of field servers such as the field server 830, field server 850 and field server 870, via a network 820. The field servers may be accessible from various client machines, a screen display 812, a laptop 814, and a tablet 816 connectable with the central management server 810 through network 820.

The field server 830 is managing a wireless LAN network based 840 of a multi-filter environment including pressure measuring devices 1 through 5 of via a wireless LAN access point 842. The field server 850 is managing a wireless LAN network based 860 of a multi-filter environment including pressure measuring devices 11 through 15 via a wireless LAN access point 862. The field server 870 is managing a wireless network 880 of a multi-filter environment including pressure measuring devices 21 through 25 of via a wireless integrated gateway 882.

It is noted that the pressure measuring devices in the different wireless networks may be of varying types, such as differential pressure switches, pressure switches, pressure transducers and the like, each having wireless capabilities.

Such a network configuration may be applicable for a multi-filtering environment of a piping system, servicing backwashing of system filtration components and the like.

Figure 9A:
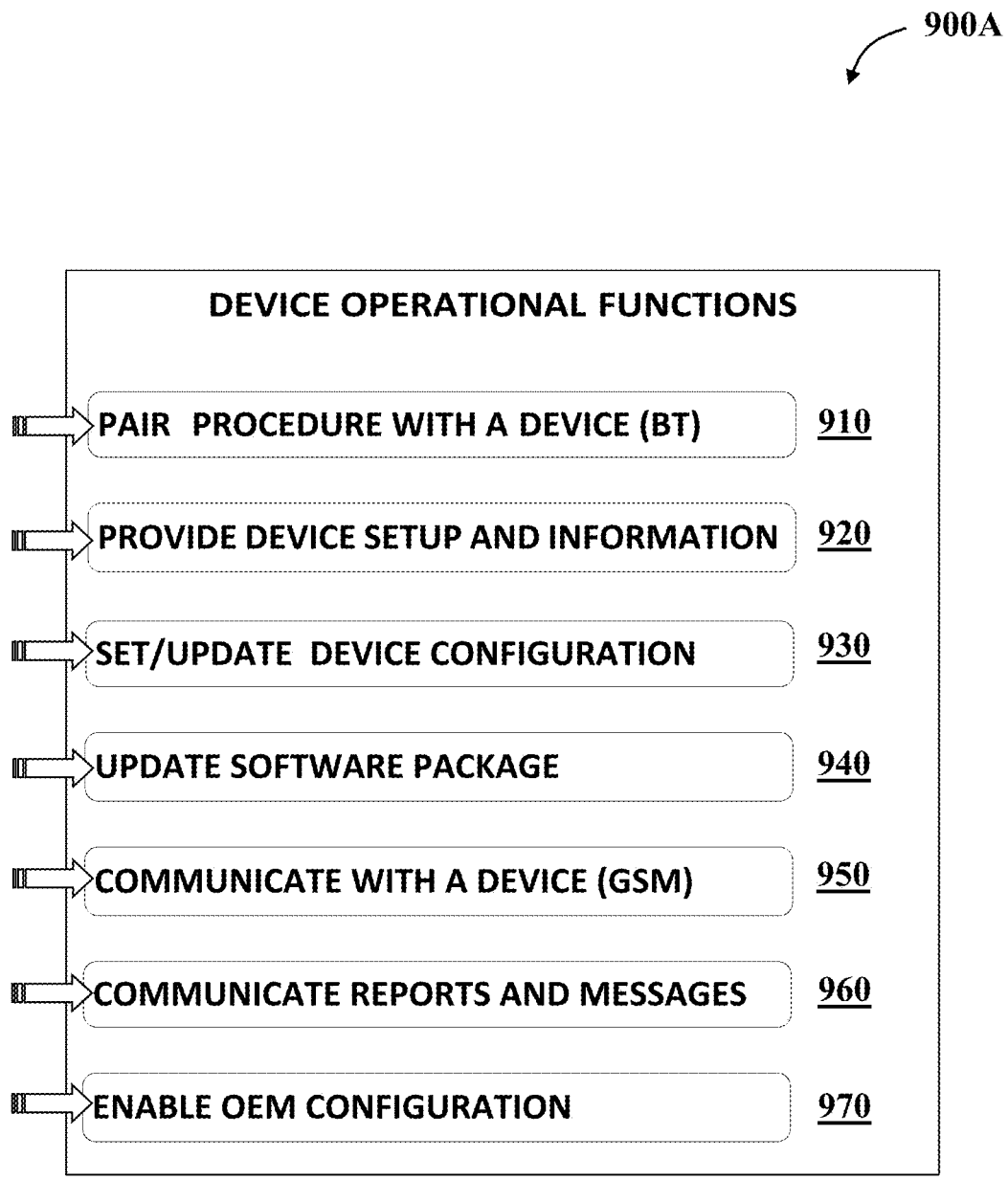
FIG. 9A is a flowchart representing a method enabling communication and interaction with the device operational functions via an external computing device, according to the presently disclosed subject matter.

Measuring Device Functions and Features:

Reference is now made to the flowchart of FIG. 9A, there is provided a method, which is generally indicated at 900A, enabling to communicate and interact with the device operational functions via an external computing device, according to the currently disclosed subject matter. It is noted that communication with the pressure measuring device by an external computing device, such as a smartphone, a tablet and the like, requires an initial pairing procedure to enable this functionality.

The method 900A includes providing a pairing procedure configured to perform handshake with an external device using Bluetooth protocol via the internal Bluetooth modem of the pressure measuring device—step 910; accessing the device setup and data storage—step 920 to read device associated measurements and log information, including the pressure at the first pressure sensor (optionally provide current/voltage output), the pressure at the second pressure sensor (optionally provide current/voltage output), the pressure difference between the first pressure and the second pressure points. Additionally or alternatively, reading of log records, optionally, downloading of stored log files; setting or updating the measuring device configuration—step 930, as detailed in FIG. 9B hereinafter; updating the software package—step 940, using Bluetooth communication through the Bluetooth internal modem of the measuring device; communicating with the measuring device, via a global system for mobile communication (GSM) module—step 950 providing remote accessibility; transmitting communication messages and error messages via an external GSM module—step 960, as detailed in FIG. 9C hereinafter; and enabling Original Equipment Manufacturing (OEM) configurations—step 970, allowing various OEM functions, including changing of the logo, changing the software application name and the more.

It is noted that the step of updating the software package may include downloading an updated software module with new features, including bug fixes. Additionally, the updating the software package may include functionality to reset to the software module to factory settings.

Figure 9B:
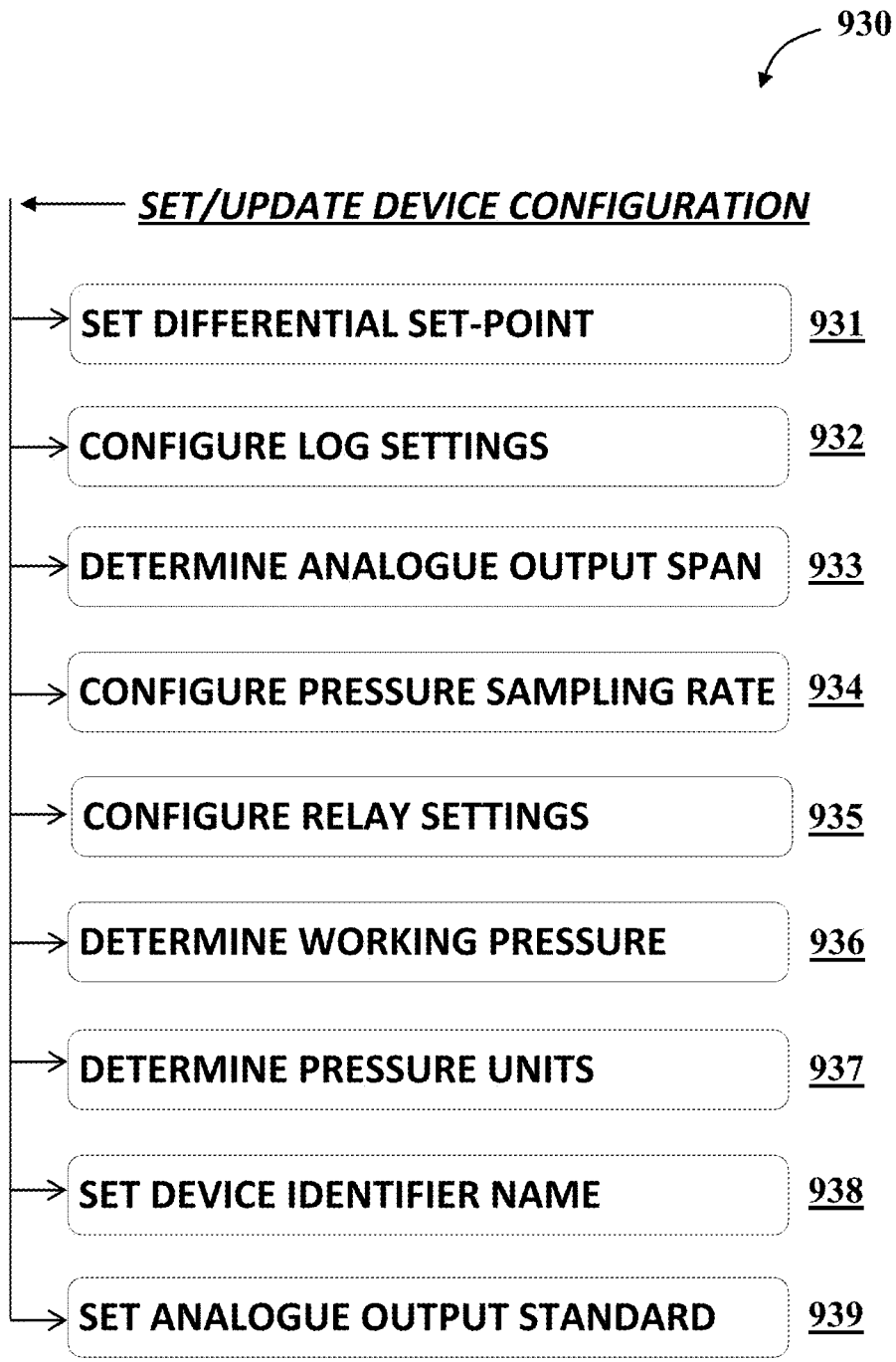
FIG. 9B is a flowchart representing a method enabling an external computing device to communicate with the measuring device to set or update various device configurations, according to the presently disclosed subject matter.

Reference is now made to the flowchart of FIG. 9B, there is provided a method, which is generally indicated at 930 (see FIG. 9A), enabling an external computing device to communicate with the measuring device to set or update various device configurations, according to the currently disclosed subject matter. It is noted that communication with the pressure measuring device by an external computing device, such as a smartphone, a tablet and the like, requires an initial pairing procedure to enable this functionality.

The method 930 includes setting differential pressure set-points—step 931, operable to set the desired set point or set point range; configuring log setting parameters—step 932, including associated events for logging and frequency of logging; determining the span of analog outputs—step 933 associated with analog outputs of differential pressure, first pressure and second pressure; configuring pressure sampling rate—step 934; configuring relay settings—step 935; determining working pressure—step 936 based on the installed sensor at system startup; determining pressure units—step 937; setting of device name identifier—step 938 as a unique name within its network to differentiate it from other devices; and setting analog output standard—step 939 selectable from the different possible options (4-20 milli-amps, 1-5 volts DC, 0-5 volts DC, 0-10 volts or 1-10 volts).

It is noted that the step of configuring relay setting may include determining the relay switch time based upon differential pressure (DP), time laps or combination thereof. It is further noted that the minimum time between switches, maximum number of switches may be pre-defined in a time unit, for example. The pressure measuring device may signal an error message when the specified number exceeds a pre-defined threshold value.

Figure 9C:
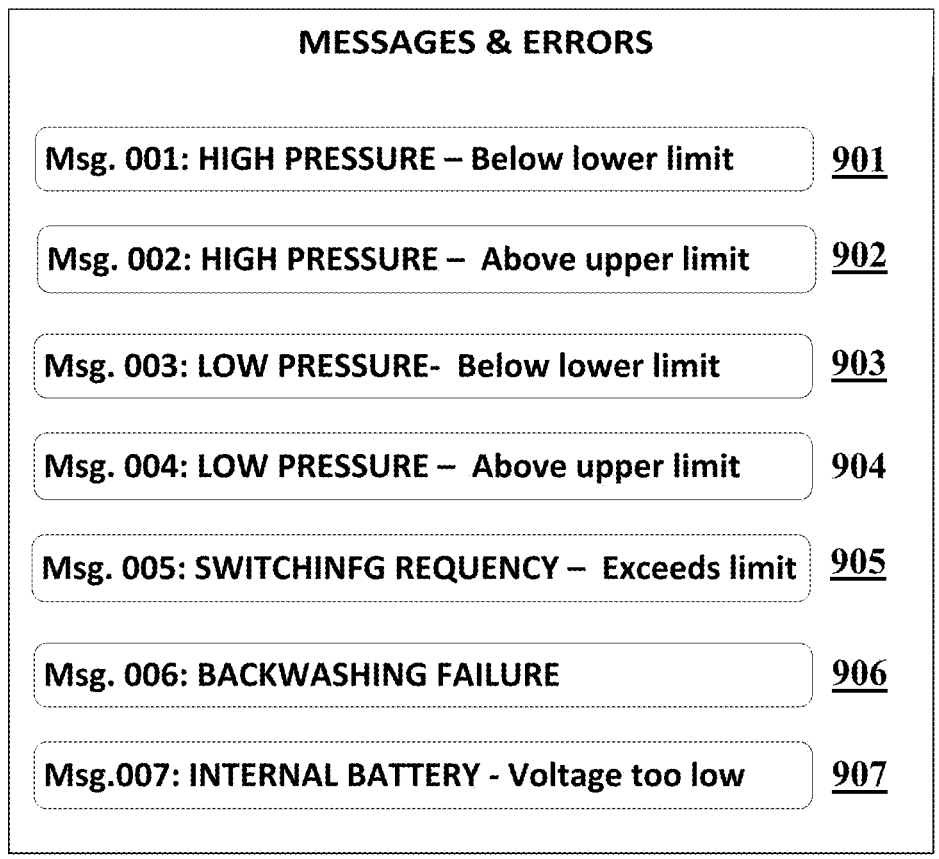
FIG. 9C is a flowchart representing a method enabling to communicate messages and error messages to provide indications of warnings or possible malfunctions of the pressure measuring device, according to the currently disclosed subject matter.

Reference is now made to the flowchart of FIG. 9C, there is provided a method, which is generally indicated at 900C, enabling to communicate messages and error messages to provide indications of warnings or possible malfunctions of the pressure measuring device, according to the presently disclosed subject matter. It is noted that the communication messages associated with the functioning of the pressure measuring device may be presented by an external computing device, such as a smartphone, a tablet and the like.

The method 900C includes providing a set of error and informational messages, identified by a message numerator/indicator such as Msg. 001 and further, for example. The set of messages includes a message of high pressure is below the lower limit—901; a message of high pressure is above upper limit—902; a message of low pressure is below the lower limit—903; a message of low pressure is above upper limit—904; a message of switching frequency exceeding limit—905; a message of backwashing failure—906; a message of internal battery voltage is too low—907.

It should be appreciated that the above set of messages are presented by way of example only, and should not be considered as limiting. Additional messages may be provided as necessary. Optionally, the system may provide additional information to further clarify the message.

Figure 10:
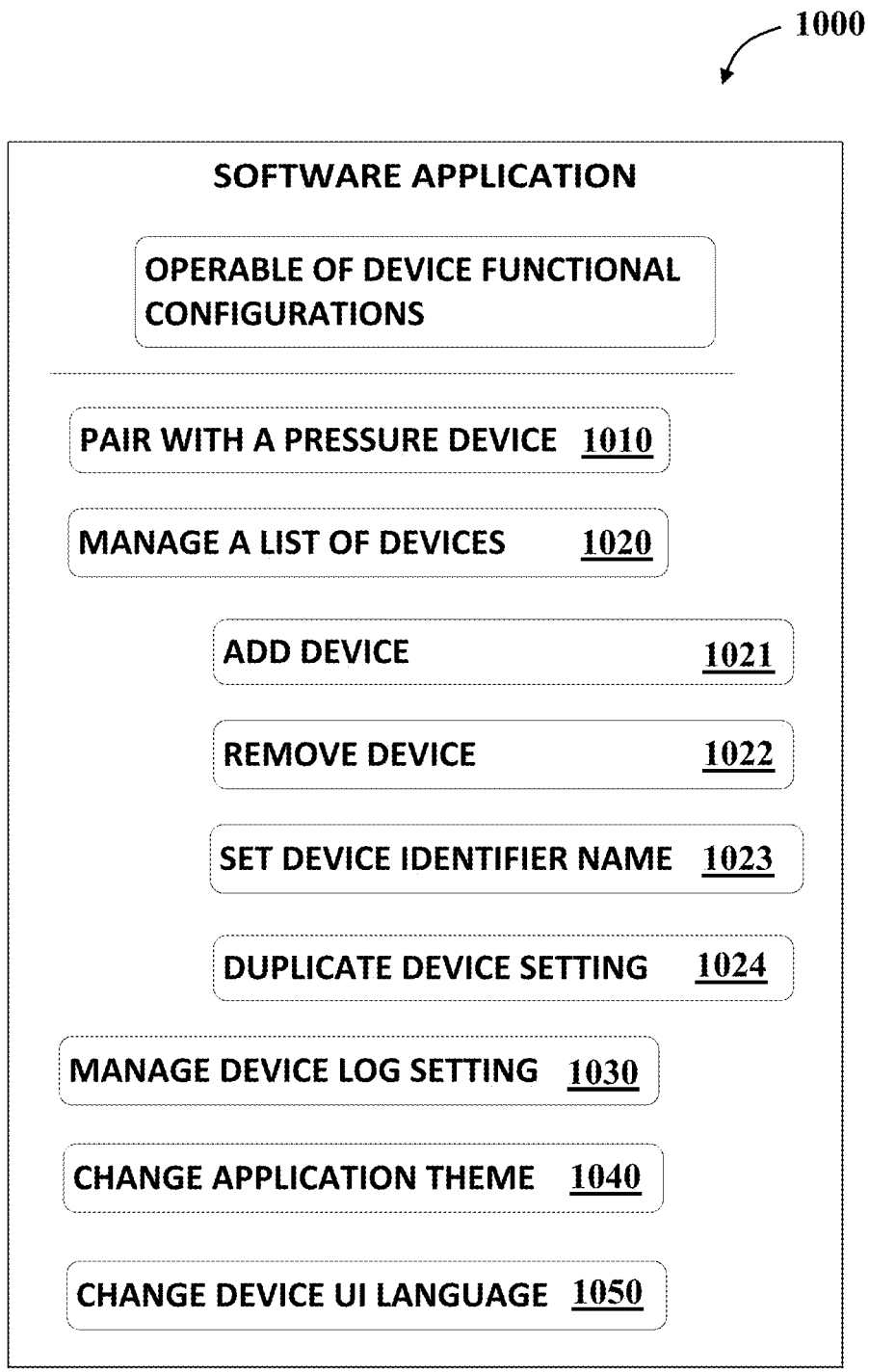
FIG. 10 is a flowchart representing a method enabling a software application operable to control and monitor a pressure measuring device using a communication protocol, according to the presently disclosed subject matter.

The Software Application:

Reference is now made to the flowchart of FIG. 10, there is provided a method, which is generally indicated at 1000, enabling a software application operable to control and monitor a pressure measuring device using a communication protocol such as Bluetooth and the like, according to the currently disclosed subject matter. It is noted that the software application is configured to provide a complete user interface for the pressure measuring device, thus providing a highly reliable pressure device.

The method 1000 is operable to support the functionalities as indicated in the method 900A (see FIG. 9A). The method further includes pairing and handshaking with a pressure measuring device—step 1010; managing a list of pressure measuring devices—step 1020 in a network deployment, in which case the method 1000 supports adding a pressure measuring device to the managed list of devices—step 1021; removing a pressure measuring device from the managed list of devices—step 1022; setting a device identifier name—step 1023, such that the identifier name is unique within the managed list of devices; and duplicating a device setting to another pressure measuring device—step 1024.

Additionally, the method 1000 is configured to managing pressure measuring device log settings—step 1030, including the set of events to be recorded and the frequency to saving associated data to device log file; changing the software application theme—step 1040; and changing the language used for the user interface of the software application.

Figure 11:
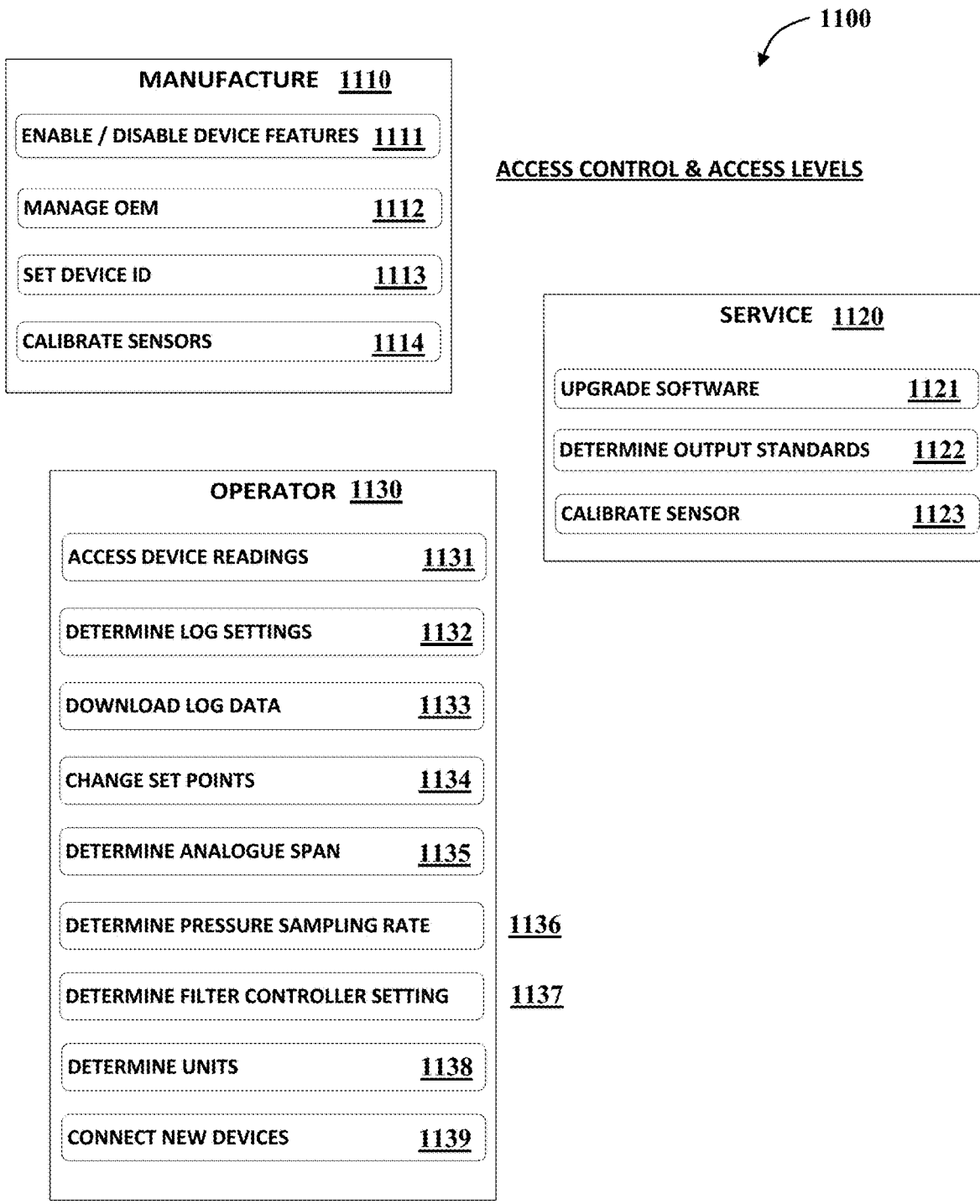
FIG. 11 is a flowchart representing a method for providing access control to a pressure measuring device at different possible levels, according to the currently disclosed subject matter.

Access Control and Access Levels:

Reference is now made to the flowchart of FIG. 11, there is provided a method, which is generally indicated at 1100, for providing access control to a pressure measuring device at different possible levels of according the associated operation at manufacturing, at servicing and at operating the pressure device, according to the currently disclosed subject matter.

Access control, as determined at the manufacturing level 1110 allows to enable or disable various pressure measuring device features—step 1111; managing Original Equipment Manufacturing (OEM) configurations—step 1112; setting pressure measuring device ID—step 1112; calibrating the piezoelectric sensors—step 1114.

Access control, as determined at the service level 1120 allows upgrading the software module components associated with the pressure measuring device (according to its configuration)—step 1121; determining the analog output standards—step 1122, selectable from a group consisting of 4-20 milliamps, 0-5 volts DC, 1-5 volts DC, 0-10 volts DC, 1-10 volts DC or other standards; and calibrating the piezoelectric sensors—step 1123.

Access control, as determined at the operator level 1130 allows to reading current device pressure measurement readings—step 1131; determining log settings—step 1132; downloading log data files—step 1133; changing set points—step 1134; determining analog output spans—step 1135; determining pressure sampling rate—step 1136; determining filter controller settings—step 1137; determining measurement units—step 1138; and connecting new devices—step 1139.

User Interface Samples:

Reference is now made to the illustrations of FIGS. 12A-G, showing various smartphone software application screen shots images of the main screen, device system configuration options and wash controlling procedures.

The software application display comprises a header section, a body section and a bottom section. The header section may include the device name, indications for the availability of the communication protocols (Bluetooth and GSM), the title of the current display, and associated buttons for accessible options such as setup button, Current Readings button, Control Timers button and more. Further, the body of the display provides the various fields associated with the current display. The bottom section may include an activation/deactivation of an "ON/OFF" button, "Device Manager" button, and "Update" button and more.

Figure 12A:
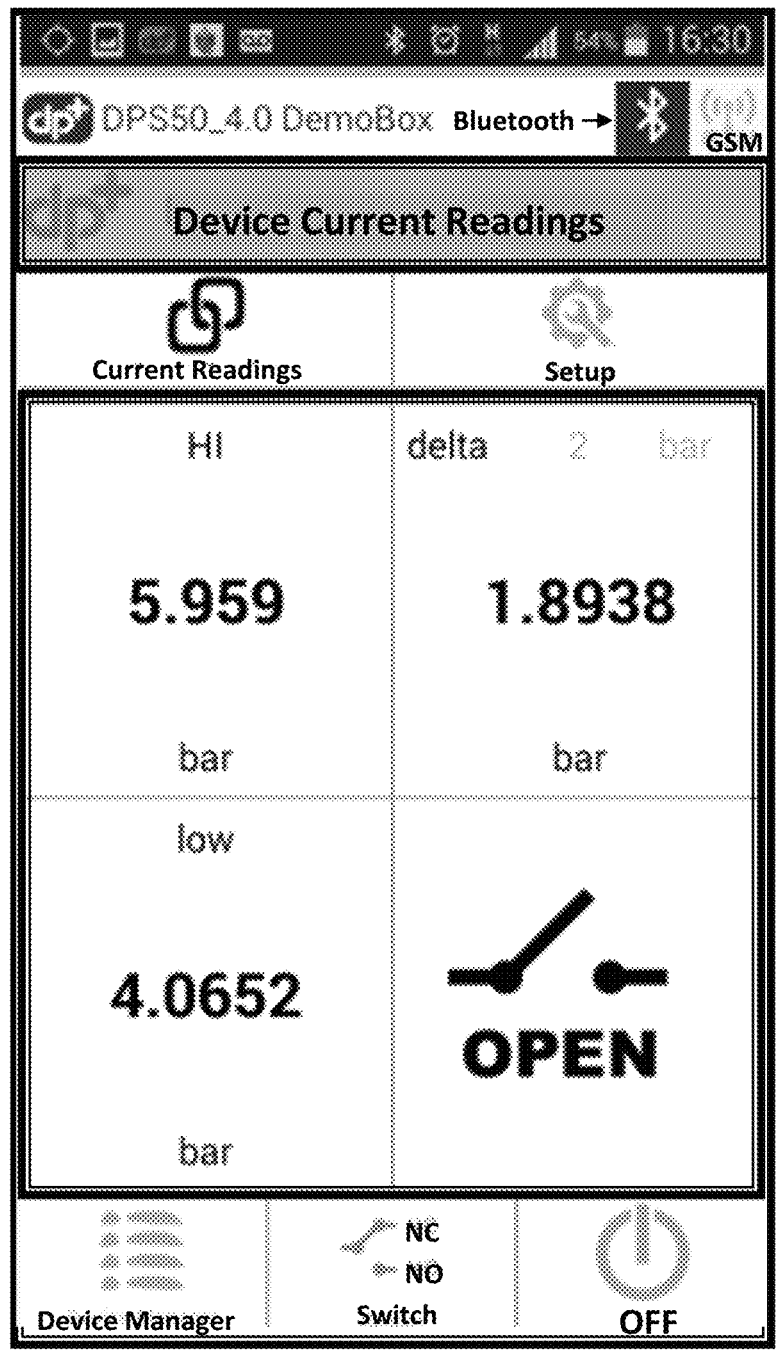
FIGS. 12 A-G are a set of screen shots showing various smartphone configuration screens of the software associated application.

As illustrated in FIG. 12A, there is provided one possible screen shot display of a main display, including high pressure in bars, low pressure in bars, differential pressure in bars and status of the switch (Open). It is noted that units of measurements are configurable, as shown hereinafter in setup screen shots.

FIGS. 12B-E represent various setting screen shots, accessible via the setup button in the header section. Setup may include functionality of settings, variously: Measurement settings; Unit settings; Error messages settings; Analog output settings; Language & regional settings; Access control settings; About the device; and more.

Figure 12B:
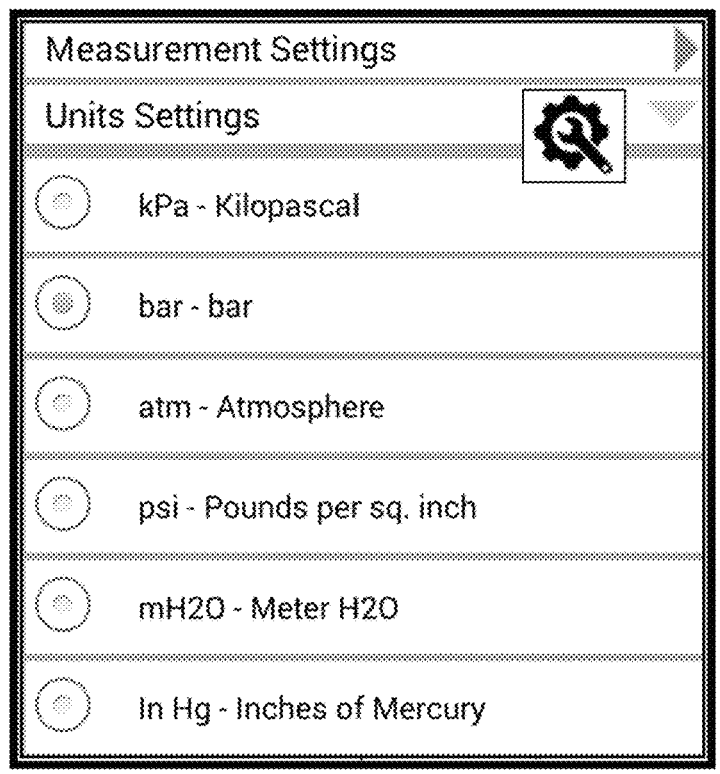

As illustrated in FIG. 12B, there is provided a setup screen shot display of a Units Settings, enabling selection of measurement units selected from a group consisting of: Kilopascal (kPa), bar, Atmosphere (atm), Pounds per square inch (psi), meters of H2O, inches of mercury.

Figure 12C:
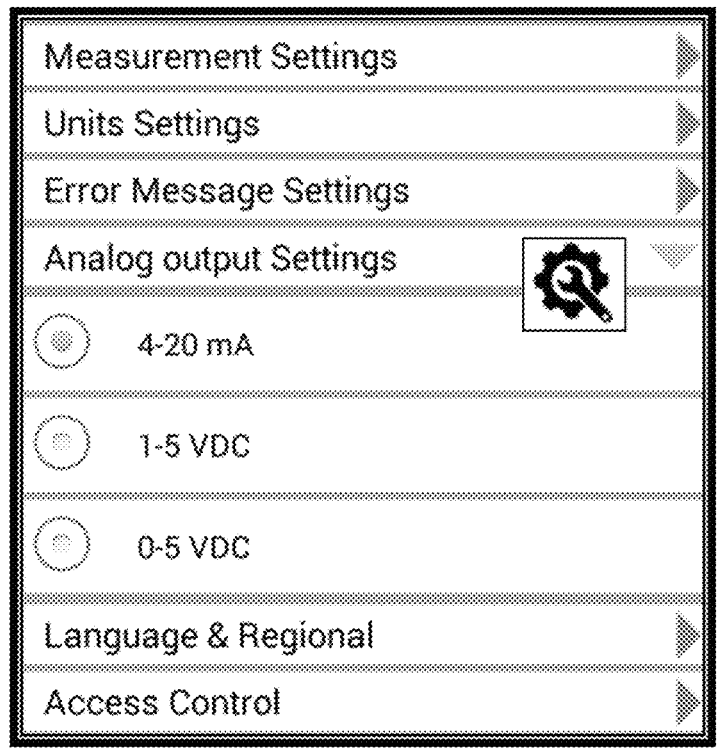

As illustrated in FIG. 12C, there is provided a setup screen shot display of Analog output settings, enabling selection of analog output standard selected from a group consisting of: 4-20 milliamps, 1-5 volts DC; 0-5 volts DC. It is noted that additional standards may be used such as 0-10 volts DC; 1-10 volts DC; and other acceptable standards.

Figure 12D:
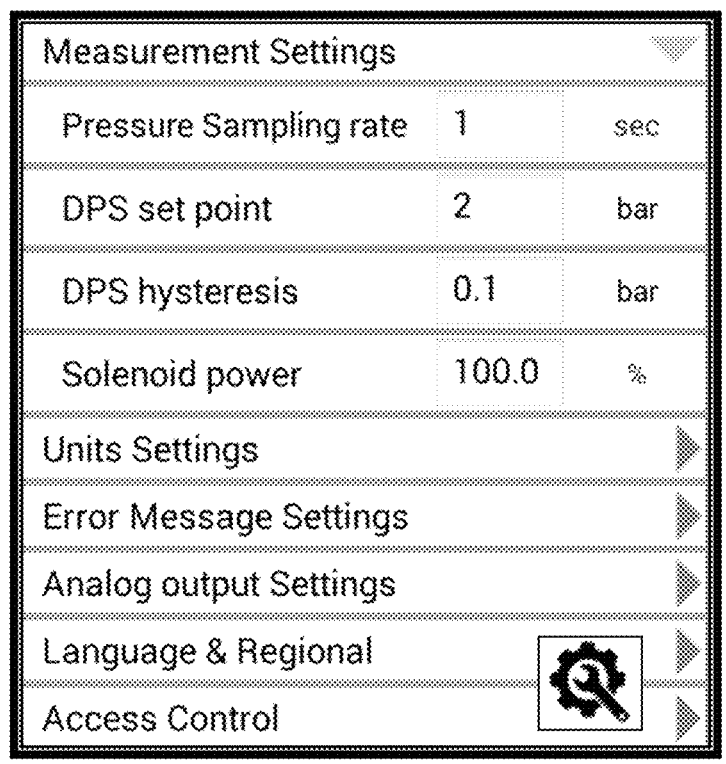

As illustrated in FIG. 12D, there is provided a setup screen shot display of Measurements settings, enabling selection of various configuration options, such as Pressure sampling rate; DPS set point; DPS hysteresis; Solenoid power; and more.

Figure 12E:
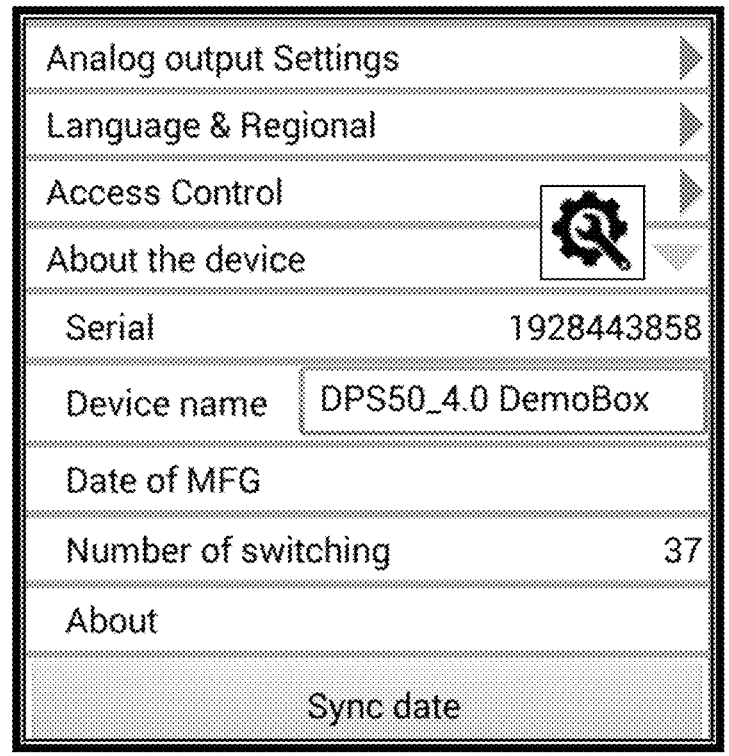

As illustrated in FIG. 12E, there is provided a setup screen shot display of About the device settings, enabling to configure the device serial number (mainly for device identification), Device name, date of manufacturing; number of switching; and general information section.

Figure 12F:
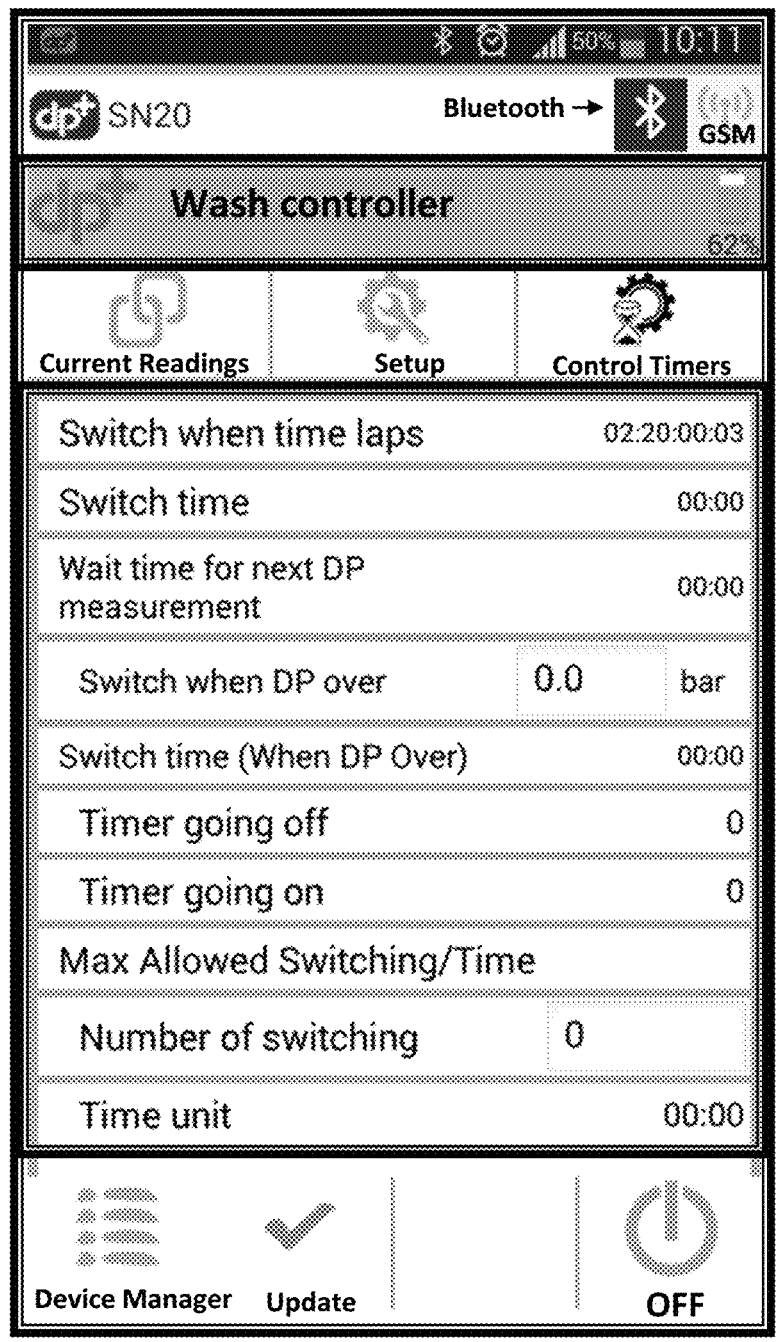

As illustrated in FIG. 12F, there is provided a possible screen shot display of a first set of the wash control timers' configurations options. The possible configuration options of the first set, may include settings associated with switching timings.

Figure 12G:
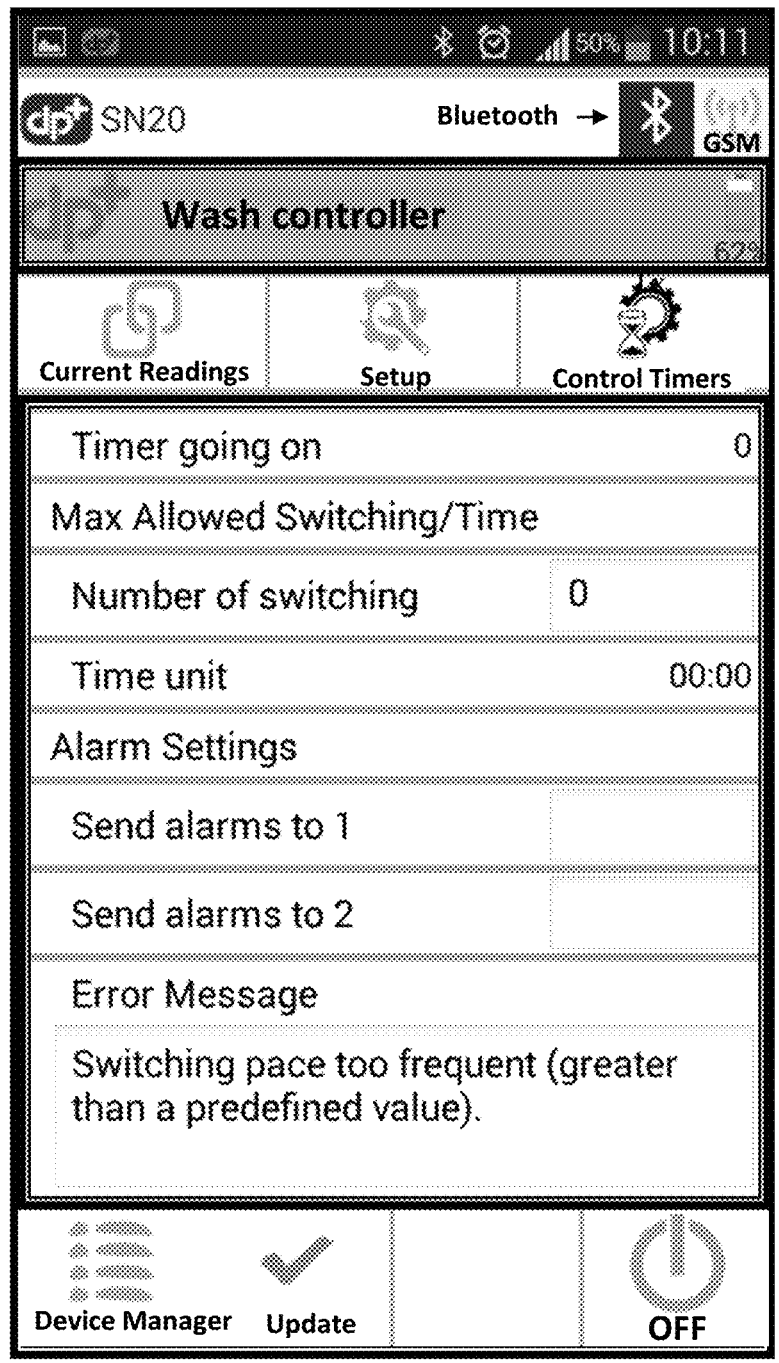

As illustrated in FIG. 12G, there is provided another possible screen shot display of a second set of the wash controller control timers' configurations options. The possible configuration options of the second set may include settings such as setting of Maximum allowed switching per time unit, Alarm settings, Error messages settings and more.
Remarks and Technical Notes:

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number, and a second indicate number and "ranging/ranges from" a first indicate number "to" a second indicate number are used herein interchangeably and are meant to include the first and second indicated numbers and all the fractional and integral numerals there between. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A multi-function pressure device operable to manage pressure control in a system comprising at least one flow limiting device, said multi-function pressure device comprising:
    a differential pressure measuring system comprising a pressure compartment split into a first isolated compartment and a second isolated compartment, at least one measuring sensor and at least one set of external interfaces;
    a flushing control system configured to control a flushing procedure of said at least one flow limiting device of said system;
    at least one processor operable to receive output from the at least one measuring sensor and to execute a software module configured to interpret and analyze measured data from said at least one measuring sensor and operate said multi-function pressure device according to a pre-configured functionality; and
    at least one communication unit in communication with said at least one processor and further operable to communicate with at least one external communication device via at least one communication interface,
    wherein said at least one measuring sensor comprises a piezoelectric measuring sensor configured to monitor differential pressure between the first isolated compartment and the second isolated compartment.

2. The multi-function pressure device of claim 1, wherein said pre-configured functionality determines the device active type selected from a group consisting of: a differential pressure transducer (DPT), a differential pressure switch (DPS), a pressure switch (PS), a pressure transducer (PT), a data logger and combinations thereof.

3. The multi-function pressure device of claim 1, wherein said flushing procedure is operable according to a flushing scheduling plan.

4. The multi-function pressure device of claim 1, wherein said flushing control system is operable according to a configured state of enabled or disabled.

5. The multi-function pressure device of claim 1, wherein said flushing control system is operable such that an externally conformable system to said flushing control system is connectable to said multi-function pressure device.

6. The multi-function pressure device of claim 1, wherein said at least one processor further comprises an internal clock configured to associate a timestamp with each pressure measurement.

7. The multi-function pressure device of claim 1, is retrofittable in a molded casing such that the electronic components are not exposed to the external environment.

8. The multi-function pressure device of claim 1, wherein said at least one set of external interfaces is selected from a group consisting of: at least one differential pressure switch control output, at least one analog output configured to communicate output measurements pertaining to the differential pressure between said first isolated compartment and said second isolated compartment, an integral differential pressure transducer operable to provide an analog output to an integral proportional differential controller, a data storage unit operable to provide internal and external data storage functionality, and encrypted data storage unit and combinations thereof.

9. A method for use in a multi-function pressure device installable in a system comprising a pressure compartment split into a first isolated compartment and a second isolate compartment, at least one flow limiting device, said multi-function pressure device comprising at least one piezoelectric measuring sensor configured to monitor differential pressure between the first isolated compartment and the second isolated compartment, a communication unit in communication with at least one external communication device and a processing unit, said method for using said multi-function pressure device to manage pressure control in an improved manner, the method comprising:
    determining a functional configuration of said multi-function pressure device, the functional configuration specifying a device active type of said multi-function pressure device;
    receiving at least one electronic signal from said piezoelectric measuring sensor expressive of differential pressure between the first isolated compartment and the second isolated compartment; and
    operating said multi-function pressure device according to said functional configuration.

10. The method of claim 9, wherein the determining of said functional configuration, comprises:
    pairing with said at least one external communication device; and
    receiving, from said at least one external communication device, setup instructions to determine the functional configuration according to said device active type.

11. The method of claim 9, wherein the determining of said functional configuration further comprises:
    obtaining an associated calibration curve; and
    calibrating said multi-function pressure device according to an associated calibration curve of said device active type.

12. The method of claim 11, wherein obtaining said associated calibration curve further comprises:
    gathering data from a plurality of pressure measuring devices; and
    constructing said associated calibration curve of said device active type using data obtained from said plurality of pressure measuring devices.

13. The method of claim 11, wherein said associated calibration curve is constructed using a Wheatstone bridge having a first side comprising a first resistor configured as a piezoelectric element sensitive to pressure and temperature and a second resistor insensitive to pressure in a series path between a first and a second terminal and a second side comprising a third resistor configured as a piezoelectric element insensitive to pressure and sensitive to temperature and a fourth insensitive to pressure in a series path between said first terminal and said terminal and in parallel with said first side, the method further comprising:
    applying, selectively, a variable pressure to generate a voltage change between said first terminal and said second terminal to provide said associated calibration curve insensitive to temperature.

14. The method of claim 9, wherein the operating of said multi-function pressure device, comprises:
- recording data pertaining to measurement data associated with the piezoelectric measuring sensor;
- recording data pertaining to associated switching schedule activated; and
- sending recorded data to said at least one external communication device.

15. The method of claim 9, wherein the operating of said multi-function pressure device, comprises: transmitting of measured data to said at least one external communication device in real-time.

16. The method of claim 9 wherein the operating of said multi-function pressure device, comprises:
- obtaining a differential pressure measurement;
- if said differential pressure measurement value is greater than a first pressure threshold and lower than a second pressure threshold then communicating said pressure measurement; and
- if said differential pressure measurement value is below said first pressure threshold or above said second pressure threshold then communicating said pressure measurement and further activating a response procedure.

17. The method of claim 16, wherein said response procedure is selected from a group consisting of: transmitting an alerting signal, transmitting a warning signal, driving a solenoid and combinations thereof.

18. The method of claim 9, wherein the operating of said multi-function pressure device, comprises: controlling a flushing procedure of said at least one flow limiting device according to a configurable flushing schedule.

19. The method of claim 9 wherein the operating of said multi-function pressure device, comprises:
- obtaining a differential pressure measurement;
- if said differential pressure measurement value is lower than a first pressure threshold then recording said pressure measurements and activating a solenoid; and
- if said differential pressure measurement value is higher than the first pressure threshold then recording said pressure measurement.

20. The method of claim 9 wherein the operating of said multi-function pressure device, comprises:
- obtaining a differential pressure measurement;
- if said differential pressure measurement value is higher than a second pressure threshold then recording said pressure measurements and deactivating a solenoid; and
- if said differential pressure measurement value is lower than the second pressure threshold then recording said pressure measurement.

21. The method of claim 9 wherein the operating of said multi-function pressure device, comprises:
- obtaining a differential pressure measurement;
- if said differential pressure measurement value is lower than a first pressure threshold then activating a solenoid;
- if said differential pressure measurement value is higher than the first pressure threshold then if said pressure measurement value is higher than a second pressure threshold then deactivating a solenoid; and
- if said differential pressure measurement value is lower than the second pressure threshold then recording said pressure measurement.

* * * * *